(12) United States Patent
Shen

(10) Patent No.: US 12,396,032 B2
(45) Date of Patent: Aug. 19, 2025

(54) RESOURCE CONFIGURATION METHOD AND APPARATUS, DEVICE, AND STORAGE MEDIUM

(71) Applicant: VIVO MOBILE COMMUNICATION CO., LTD., Guangdong (CN)

(72) Inventor: Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 494 days.

(21) Appl. No.: 17/705,097

(22) Filed: Mar. 25, 2022

(65) Prior Publication Data
US 2022/0217778 A1  Jul. 7, 2022

Related U.S. Application Data

(63) Continuation of application No. PCT/CN2020/117232, filed on Sep. 23, 2020.

(30) Foreign Application Priority Data

Sep. 27, 2019 (CN) ............ 201910927252.1

(51) Int. Cl.
*H04W 74/0816* (2024.01)
*H04L 27/26* (2006.01)
(Continued)

(52) U.S. Cl.
CPC ... *H04W 74/0816* (2013.01); *H04L 27/26025* (2021.01); *H04L 27/2607* (2013.01); *H04W 72/0453* (2013.01); *H04W 74/0866* (2013.01)

(58) Field of Classification Search
USPC ....... 370/229, 230, 236, 252, 328, 329, 330, 370/341, 345, 436, 445, 468
See application file for complete search history.

(56) References Cited

U.S. PATENT DOCUMENTS

2008/0240275 A1  10/2008  Cai
2015/0009911 A1*  1/2015  Li ................ H04L 5/0037
370/329

(Continued)

FOREIGN PATENT DOCUMENTS

CN  101136894 A  3/2008
CN  106162889 A  11/2016
(Continued)

OTHER PUBLICATIONS

First Office Action for Indian Application No. 202227023997, dated Sep. 7, 2022, 6 Pages (including English Translation).

(Continued)

*Primary Examiner* — Nguyen H Ngo
(74) *Attorney, Agent, or Firm* — BROOKS KUSHMAN P.C.

(57) ABSTRACT

A resource configuration method and apparatus, a device, and a storage medium are provided. The resource configuration method includes: receiving first indication information and a configuration parameter that are sent by a network device, where the first indication information is used to indicate initially configured PRBs in at least one LBT subband, and the configuration parameter includes an SCS; determining a position of at least one intra-carrier guard band PRB in the at least one LBT subband based on at least one of the first indication information, the configuration parameter, and a processing capability of the user equipment; and determining a target PRB based on the initially configured PRBs and the position of the intra-carrier guard band PRB.

15 Claims, 14 Drawing Sheets

(51) Int. Cl.
   *H04W 72/0453* (2023.01)
   *H04W 74/08* (2009.01)

(56) References Cited

U.S. PATENT DOCUMENTS

| | | | |
|---|---|---|---|
| 2017/0238320 A1* | 8/2017 | Fukuta | H04W 72/0453 370/329 |
| 2019/0116016 A1 | 4/2019 | Xiao et al. | |
| 2019/0149365 A1 | 5/2019 | Chatterjee et al. | |
| 2019/0168474 A1 | 6/2019 | Stavariu | |
| 2019/0260530 A1 | 8/2019 | Yi et al. | |
| 2020/0112944 A1 | 4/2020 | Jiang et al. | |
| 2020/0177353 A1 | 6/2020 | Ding et al. | |
| 2020/0296758 A1 | 9/2020 | Li et al. | |
| 2020/0344758 A1* | 10/2020 | Li | H04L 5/0064 |
| 2020/0351682 A1* | 11/2020 | Cirik | H04W 76/28 |
| 2022/0264606 A1 | 8/2022 | Li et al. | |

FOREIGN PATENT DOCUMENTS

| | | |
|---|---|---|
| CN | 106454881 A | 2/2017 |
| CN | 107888350 A | 4/2018 |
| CN | 108513356 A | 9/2018 |
| CN | 108810996 A | 11/2018 |
| CN | 109672514 A | 4/2019 |
| CN | 109842939 A | 6/2019 |
| CN | 109995497 A | 7/2019 |
| IN | 202227024763 A | 9/2022 |
| KR | 20190017974 A | 2/2019 |
| WO | 2020166878 A1 | 8/2020 |
| WO | 2021093767 A1 | 5/2021 |

OTHER PUBLICATIONS

First Office Action for Japanese Application No. 2022-519330, dated May 1, 2023, 3 Pages.
Nokia, Nokia Shanghai Bell, "On wideband operation in NR-U" 3GPP TSG RAN WG1 Meeting #98, Praha, Česká Republika, Aug. 2019, R1-1908688, 11 Pages.
Intel Corporation, "Definition of nominal channel spacing for CA" 3GPP TSG-RAN WG4 Meeting #91, Nevada, USA, May 2019, R4-1905894, 5 Pages.
Extended European Search Report for Application No. 20868132. 0-1213/40444 84 PCT/CN2020117232 dated Nov. 29, 2022.
ETRI, 3GPP TSG RAN WG1 Meeting #98, Wideband Operation for NR-U, Prague, CZ Aug. 26-30, 2019, dated Aug. 26-30, 2019.
Huawei, HiSilicon, 3GPP TSG RAN WGI Meeting #98, Prague, Czech Republic, 2019, NRU wideband BWP operation, dated Aug. 26-30, 2019.
Ericsson, 3GPP TSG-RAN WG1 Meeting #98, Prague, Czech Republic, Wideband Operation for NR-U, dated Aug. 26-30, 2019.
First Office Action for Chinese Application No. 201910927252.1, dated Aug. 18, 2021, 10 Pages.
International Search Report and Written Opinion for Application No. PCT/CN2020/117232, dated Dec. 31, 2020, 6 Pages.
Vivo, "Discussion on Physical UL Channel Design in Unlicensed Spectrum," 3GPP TSG RAN WG1 #95, Agenda item 7.2.2.3.2, Nov. 12-16, 2018, R1-1812299, Spokane, WA, USA, 11 Pages.
First Office Action for Korean Application No. 10-2022-7013795, dated Oct. 22, 2024, 5 Pages.
Nokia, Nokia Shanghai Bell "On wideband operation in NR-U" 3GPP TSG RAN WG1 Meeting #97, Reno, Nevada, USA, May 2019, R1-1906657, 15 Pages.
Qualcomm Incorporated "Wideband operation for NR U" 3GPP TSG RAN WG1 Meeting #98, Prague, CZ, Aug. 2019, R1 1909249, 6 Pages.

* cited by examiner

RESOURCE CONFIGURATION METHOD AND APPARATUS, DEVICE, AND STORAGE MEDIUM

CROSS-REFERENCE TO RELATED APPLICATIONS

This application is a continuation application of PCT International Application No. PCT/CN2020/117232 filed on Sep. 23, 2020, which claims priority to Chinese Patent Application No. 201910927252.1 filed on Sep. 27, 2019, which are incorporated herein by reference in their entireties.

TECHNICAL FIELD

Embodiments of this disclosure relate to the communications field, and in particular, to a resource configuration method and apparatus, a device, and a storage medium.

BACKGROUND

In an unlicensed band in new radio (NR), before sending information, a terminal or a network device needs to perform clear channel assessment (CCA) or extended clear channel assessment (eCCA) to monitor a channel, so as to perform energy detection (ED). When energy is lower than a threshold, the channel is determined as idle, and transmission can start only in this case. This is known as listen before talk (LBT).

For a wideband carrier in the unlicensed band, CCA is performed on a specified LBT subband, and in configurations of many resources, scheduling or indicating is performed by using an LBT subband as a granularity. When operating on the wideband carrier and performing transmission on at least one LBT subband, an intra-carrier guard band needs to be reserved to ensure that the transmission of this LBT subband does not interfere with transmission of an adjacent LBT subband. However, currently there is no solution to configuring frequency domain resources in presence of an intra-carrier guard band.

SUMMARY

According to a first aspect, an embodiment of this disclosure provides a resource configuration method. The method is applied to user equipment and includes:
receiving first indication information and a configuration parameter that are sent by a network device, where the first indication information is used to indicate initially configured physical resource blocks (PRBs) in at least one LBT subband, and the configuration parameter includes a subcarrier spacing (SCS);
determining a position of at least one intra-carrier guard band PRB in the at least one LBT subband based on at least one of the first indication information, the configuration parameter, and a processing capability of the user equipment; and determining a target PRB based on the position of the intra-carrier guard band PRB and the initially configured PRBs.

According to a second aspect, an embodiment of this disclosure provides a resource configuration method. The method is applied to a network device and includes:
configuring at least one LBT subband and a configuration parameter for user equipment, where the at least one LBT subband includes initially configured PRBs, and the configuration parameter includes an SCS;
determining positions of candidate intra-carrier guard band PRBs in the at least one LBT subband based on at least one of the at least one LBT subband, the configuration parameter, and a processing capability of the user equipment;
selecting at least one intra-carrier guard band PRB from the candidate intra-carrier guard band PRBs based on the positions of the candidate intra-carrier guard band PRBs; and
sending first indication information and fifth indication information to the user equipment, where the first indication information is used to indicate the initially configured PRBs in the at least one LBT subband, and the fifth indication information is used to indicate the at least one intra-carrier guard band PRB, so that the user equipment removes the intra-carrier guard band PRB from the initially configured PRBs.

According to a third aspect, an embodiment of this disclosure provides a resource configuration method. The method is applied to user equipment and includes:
receiving first indication information and fifth indication information sent by a network device, where the first indication information is used to indicate initially configured PRBs in at least one LBT subband, and the fifth indication information is used to indicate at least one intra-carrier guard band PRB; and determining a target PRB based on the initially configured PRBs and the intra-carrier guard band PRB.

According to a fourth aspect, an embodiment of this disclosure provides a resource configuration method. The method is applied to a network device and includes:
sending seventh indication information to user equipment, where the seventh indication information is used to indicate a plurality of starting PRBs, and sending a bitmap or a resource indicator value corresponding to each starting PRB, so that the user equipment uses each starting PRB as a starting point to obtain a configured PRB by using the bitmap or the resource indicator value corresponding to the starting PRB.

According to a fifth aspect, an embodiment of this disclosure provides a resource configuration method. The method is applied to user equipment and includes:
receiving seventh indication information sent by a network device, where the seventh indication information is used to indicate a plurality of starting PRBs, and receiving a bitmap or a resource indicator value corresponding to each starting PRB and sent by the network device; and
using each starting PRB as a starting point to obtain a configured PRB by using the bitmap or the resource indicator value corresponding to the starting PRB.

According to a sixth aspect, an embodiment of this disclosure provides a resource configuration apparatus. The apparatus is applied to user equipment and includes:
an information receiving module, configured to receive first indication information and a configuration parameter that are sent by a network device, where the first indication information is used to indicate initially configured PRBs in at least one LBT subband, and the configuration parameter includes an SCS;
a PRB position determining module, configured to determine a position of at least one intra-carrier guard band PRB in the at least one LBT subband based on at least one of the first indication information, the configuration parameter, and a processing capability of the user equipment; and a PRB determining module, configured to determine a target PRB based on the position of the intra-carrier guard band PRB and the initially configured PRBs.

According to a seventh aspect, an embodiment of this disclosure provides a resource configuration apparatus. The apparatus is applied to a network device and includes:

a first configuration module, configured to configure at least one LBT subband and a configuration parameter for user equipment, where the at least one LBT subband includes initially configured PRBs, and the configuration parameter includes an SCS;

a PRB position determining module, configured to determine positions of candidate intra-carrier guard band PRBs in the at least one LBT subband based on at least one of the at least one LBT subband, the configuration parameter, and a processing capability of the user equipment;

a selection module, configured to select at least one intra-carrier guard band PRB from the candidate intra-carrier guard band PRBs based on the positions of the candidate intra-carrier guard band PRBs; and an information sending module, configured to send first indication information and fifth indication information to the user equipment, where the first indication information is used to indicate the initially configured PRBs in the at least one LBT subband, and the fifth indication information is used to indicate the at least one intra-carrier guard band PRB, so that the user equipment removes the intra-carrier guard band PRB from the initially configured PRBs.

According to an eighth aspect, an embodiment of this disclosure provides a resource configuration apparatus. The apparatus is applied to user equipment and includes:

an information receiving module, configured to receive first indication information and fifth indication information sent by a network device, where the first indication information is used to indicate initially configured PRBs in at least one LBT subband, and the fifth indication information is used to indicate at least one intra-carrier guard band PRB; and a PRB determining module, configured to determine a target PRB based on the initially configured PRBs and the intra-carrier guard band PRB.

According to a ninth aspect, an embodiment of this disclosure provides a resource configuration apparatus. The apparatus is applied to a network device and includes:

an indication information sending module, configured to send seventh indication information to user equipment, where the seventh indication information is used to indicate a plurality of starting PRBs, and send a bitmap or a resource indicator value corresponding to each starting PRB, so that the user equipment uses each starting PRB as a starting point to obtain a configured PRB by using the bitmap or the resource indicator value corresponding to the starting PRB.

According to a tenth aspect, an embodiment of this disclosure provides a resource configuration apparatus. The apparatus is applied to user equipment and includes:

an indication information receiving module, configured to receive seventh indication information sent by a network device, where the seventh indication information is used to indicate a plurality of starting PRBs, and receive a bitmap or a resource indicator value corresponding to each starting PRB and sent by the network device; and an execution module, configured to use each starting PRB as a starting point to obtain a configured PRB by using the bitmap or the resource indicator value corresponding to the starting PRB.

According to an eleventh aspect, an embodiment of this disclosure provides user equipment, including a processor, a memory, and a computer program stored in the memory and capable of running on the processor. When the computer program is executed by the processor, steps of the resource configuration method according to the first aspect, the third aspect, or the fifth aspect are implemented.

According to a twelfth aspect, an embodiment of this disclosure provides a network device, including a processor, a memory, and a computer program stored in the memory and capable of running on the processor. When the computer program is executed by the processor, steps of the resource configuration method according to the second aspect or the fourth aspect are implemented.

According to a thirteenth aspect, an embodiment of this disclosure provides a computer-readable storage medium. The computer-readable storage medium stores a computer program, and when the computer program is executed by a processor, steps of the resource configuration method are implemented.

BRIEF DESCRIPTION OF DRAWINGS

The specific embodiments of this disclosure hereinafter described with reference to the accompanying drawings can make this disclosure better comprehensible, where identical or similar reference numerals represent identical or similar features.

DETAILED DESCRIPTION

Figure 1:
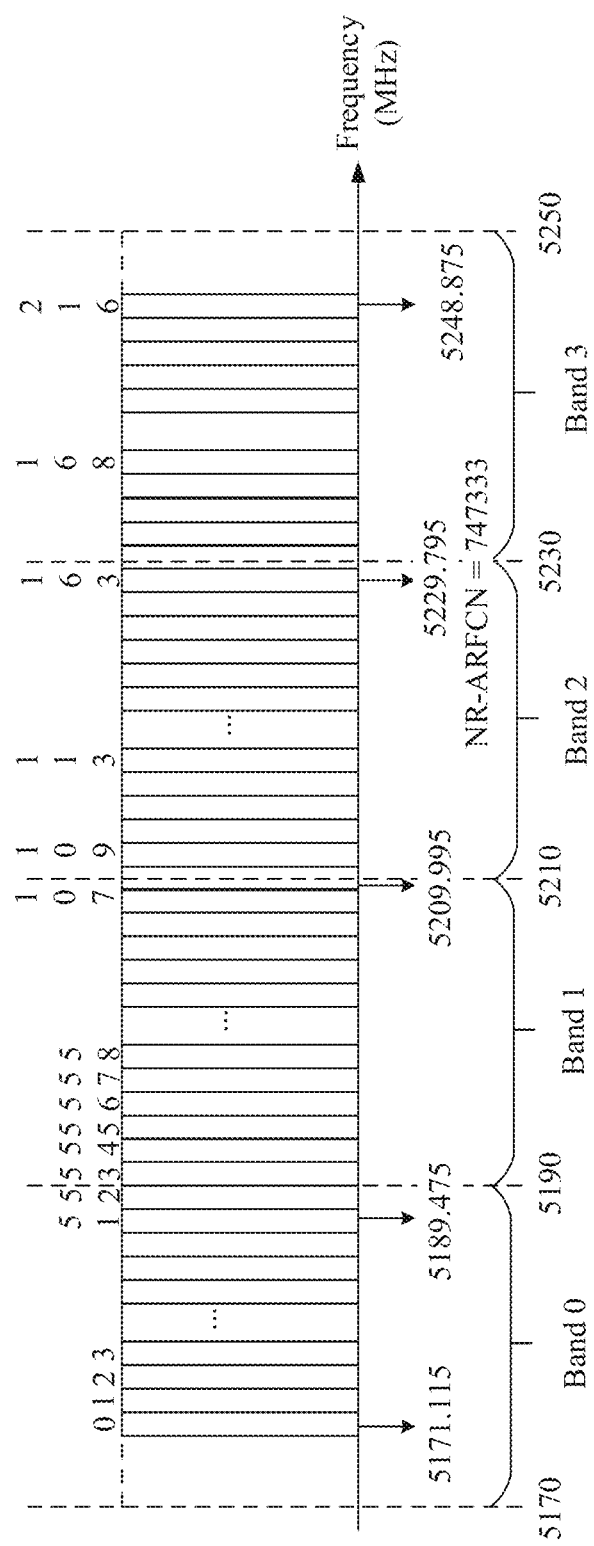
FIG. 1 is a schematic diagram of a frequency domain configuration of a Coreset in NRU Rel16.

The following clearly describes the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

Because an unlicensed band is shared by a plurality of technologies or a plurality of transmission nodes, a contention-based access mode using CCA or eCCA to monitor a channel causes uncertainty of available time of the channel. When the channel is available, an available transmission position for signal transmission on a network side may have been missed and transmission cannot be performed. Consequently, a receive end possibly cannot normally receive a signal transmitted by the network side and cannot perform terminal behavior to be performed based on the configuration of the network side after receiving the signal, for example, physical downlink control channel (PDCCH) monitoring, and radio environment monitoring and measurement. The process of determining whether the channel is available through CCA and performing transmission may be referred to as a channel access process.

In the related art, examples of types of channel access processes available in a 5G unlicensed communications system are as follows:

1. Cat 1: It means sending directly without any CCA. It can be used in a case in which a channel has been obtained and a transmission switching interval is less than 16 μs.

2. Cat 2 (Type II): It means listening to a channel for 16 μs or 25 μs. It can be used to obtain a channel for a specific signal. A maximum continuous transmission length should be less than a value, such as 1 ms.

3. Cat 4 (Type I): It means listening to a channel with random backoff. Different parameters are set for different priorities, and a maximum length that can be transmitted after the channel is finally obtained is also different.

In addition, a CCA granularity in frequency domain on 5 GHz is 20 MHz, and CCA is strictly implemented according to the specified channel planning.

In addition, frequency domain configurations in the related art may include the following examples. One example of frequency domain configurations is a frequency domain configuration of a carrier in NR Rel15. The following describes the frequency domain configuration of the carrier in NR Rel15.

In NR Rel15, a frequency domain position of an operating carrier is obtained from a system information block (SIB) 1 in system broadcast information, that is, FrequencyInfoUL-SIB and FrequencyInfoDL-SIB. First, a user obtains a specific frequency domain position of a point A by using the FrequencyInfoUL-SIB, and obtains carrier configurations in different numerlonogies by using scs-SpecificCarrierList fields of the FrequencyInfoUL-SIB and the FrequencyInfoDL-SIB, that is, an absolute frequency domain position of the point A is referenced, and a frequency domain position of the carrier is obtained by using offsetToCarrier and carrierBandwidth.

Another example of frequency domain configurations is a frequency domain configuration of a bandwidth part (BWP) in NR Rel15. The following describes the frequency domain configuration of the BWP in NR Rel15.

For an initial BWP before RRCSetup/RRCResume/RRCReestablishment is received, a frequency domain position of the initial BWP is the same as a frequency domain position of a Coreset #0.

For an initial BWP after RRCSetup/RRCResume/RRCReestablishment is received, a frequency domain position of the initial BWP is configured by using information in the SIB 1.

For a BWP dedicated to user equipment (UE), a reference bandwidth range to which the BWP belongs is obtained based on a subcarrier spacing (SCS) configuration of the BWP and carrier information configuration in the SIB1, and the frequency domain configuration of the BWP is obtained by using a resource indicator value (RIV) indicated by locationAndBandwidth in the reference range.

Still another example of frequency domain configurations is a frequency domain configuration of a control resource set (Coreset) in NR Rel15. The following describes the frequency domain configuration of the Coreset in NR Rel15.

The Coreset in NR Rel15 is configured by using a frequencyDomainResources field of an information element ControlResourceSet of radio resource control (RRC), and includes a bitmap with a fixed size of 45 bits, where each bit represents six continuous physical resource block (PRB) groups, and a PRB group to which a first bit is mapped is a first PRB group of a currently configured BWP.

Yet another example of frequency domain configurations is a frequency domain configuration of a channel state information reference signal (CSI-RS) in NR Rel15. The following describes the frequency domain configuration in this example.

The CSI-RS in NR Rel15 is configured by using startingRB and nrofRBs fields of an information element CSI-FrequencyOccupation of RRC, where the startingRB is configured relative to a common PRB #0 (CRB #0), and can only be configured as a multiple of 4 starting from 0; nrofRBs is a quantity of PRBs configured for the CSI-RS, and can only be configured as a multiple of 4 starting from 24. When the nrofRBs is configured as a value greater than a quantity of PRBs configured for the BWP, a bandwidth occupied by the CSI-RS is a bandwidth of the entire BWP.

Yet another example of frequency domain configurations is a frequency domain configuration of a sounding reference signal (SRS) in NR Rel15. The following describes the frequency domain configuration in this example.

The SRS in NR Rel15 is configured by using freqDomainPosition, freqDomainShift, and freqHopping in an information element SRS-Resource of RRC. When a value of the freqDomainShift is configured to be greater than or equal to an offset of a starting point of the BWP relative to the CRB #0, a freqDomainShift reference point configured for the SRS is the CRB #0, or else, is the starting point of the BWP. A configured frequency domain starting position of the SRS is determined by the configured freqDomainShift value, the determined reference point, and a frequency domain hopping configuration parameter. A quantity of frequency domain PRBs configured for the SRS is determined by an SRS configuration index in the freqHopping, there are 64 configurations in total, and the quantity of PRBs may be 4 to 272.

Yet another example of frequency domain configurations is a frequency domain configuration of uplink/downlink scheduling in NR Rel15. The following describes the frequency domain configuration in this example.

Both uplink frequency domain scheduling and downlink frequency domain scheduling are performed in NR Rel15 by referring to a frequency domain position of a configured active BWP, including two types: Type 0 and Type 1. For Type 0 frequency domain resource allocation, a bitmap is used to allocate frequency domain resources, where a quantity of continuous PRBs corresponding to each bit is configurable, and is related to a quantity of PRBs of the BWP, and may be one of 2, 4, 8, and 16. For Type 1 frequency domain resource allocation, a RIV value is used to allocate a PRB group continuous in frequency domain, where a size of the PRB group depends on a ratio of a quantity of PRBs of an active BWP to a quantity of PRBs of an initial BWP, and may be one of 1, 2, 4, and 8. For a DCI format 1_0, Type 1 resource allocation is used by default. For a DCI format 1_1, a resource allocation type may be an RRC configuration. When the RRC configuration enables dynamic switching, a first bit of a frequency domain allocation field of DCI indicates a downlink frequency domain resource allocation type.

Yet another example of frequency domain configurations is a frequency domain configuration in NR Rel16. The following describes the frequency domain configuration in this example.

NRU Rel16 may run on a wideband carrier (for example, 80 MHz) greater than an LBT subband, but clear channel assessment (CCA) is performed per 20 MHz LBT subband in a current 5 GHz band. In addition, other systems or nodes may run in an LBT subband in the middle of the wideband carrier. Therefore, a guard band needs to be established even if NRU Rel16 runs in an LBT subband within the carrier, so that running of the other systems or nodes is not affected.

For NRU Rel16 running on the wideband carrier, an interlace mode may be used for uplink transmission, and one interlace includes an entire operating band.

For the frequency domain configuration in NR Rel16, an intra-carrier guard band needs to be considered. The frequency domain configuration in NR Rel16 may specifically include the following aspects:

Yet another example of frequency domain configurations is a frequency domain configuration of a carrier and BWP in NRU Rel16. The following describes the frequency domain configuration in this example.

For the frequency domain configuration of the carrier and BWP in NR Rel15, any frequency domain configuration of starting PRB and ending PRB can be configured. Therefore, NRU Rel16 can flexibly use an intra-carrier guard band through a base station.

Yet another example of frequency domain configurations is a frequency domain configuration of a Coreset in NRU Rel16. The following describes the frequency domain configuration in this example.

For the frequency domain configuration of the Coreset in NR Rel15, the configuration is performed by using every six continuous PRBs per PRB group starting from a starting PRB of the BWP as a granularity. When a specific PRB group includes an intra-carrier guard band PRB, if an intra-carrier guard band needs to be reserved, the PRB group cannot be used. For NRU Rel16 running in the broad band, a multi-cluster Coreset that spans a plurality of LBT subbands needs to be configured, where each cluster is located in one LBT subband and has 48 PRBs (for a 30 kHz SCS), and the PRBs of each cluster do not include an intra-carrier guard band. As shown in FIG. 1, for a subband 2, 54 to 59 are a PRB group, but because a quantity of intra-carrier guard band PRBs is greater than 2, this PRB group cannot be used. Similarly, a PRB group of 102 to 107 cannot be configured either. Therefore, only 42 PRBs from 60 to 101 can be configured as PRBs of the coreset, and this cannot meet a requirement that the quantity of PRBs should be 48. Therefore, it cannot be ensured that each mapped PDCCH candidate is only in one LBT subband.

Yet another example of frequency domain configurations is a frequency domain configuration of a CSI-RS/SRS in NRU Rel16. The following describes the frequency domain configuration in this example.

For the frequency domain configuration of the CSI-RS/SRS in NR Rel15, only continuous PRBs can be configured. If a wideband CSI-RS/SRS needs to be configured in NRU Rel16 and no intra-carrier guard band is included, the frequency domain configuration method needs to be enhanced.

Yet another example of frequency domain configurations is a frequency domain configuration of a PUCCH in NRU Rel16. The PUCCH in NRU Rel16 may use an interlace, and one interlace spans a plurality of LBT subbands in a case of a wideband carrier. How to deal with an intra-carrier guard band is a problem that needs to be resolved.

Yet another example of frequency domain configurations is downlink frequency domain scheduling in NRU Rel16. The following describes the frequency domain configuration in this example.

For Type 0 frequency domain resource allocation, an allocation granularity of a bitmap is excessively large (maximum 16). If a PRB group represented by a bit includes an intra-band PRB, the PRB group cannot be scheduled in some cases, resulting in a waste of resources.

For Type 1 frequency domain resource allocation, continuous PRB resources are allocated by using a RIV value. When the frequency domain resource allocation spans a plurality of LBT subbands, how to deal with an intra-carrier guard band is a problem that needs to be resolved.

Yet another example of frequency domain configurations is uplink frequency domain scheduling in NRU Rel16. The following describes the frequency domain configuration in this example.

For interlace frequency domain resource allocation, one interlace spans a plurality of LBT subbands in a case of a wideband carrier. How to deal with an intra-carrier guard band is a problem that needs to be resolved.

Figure 2:
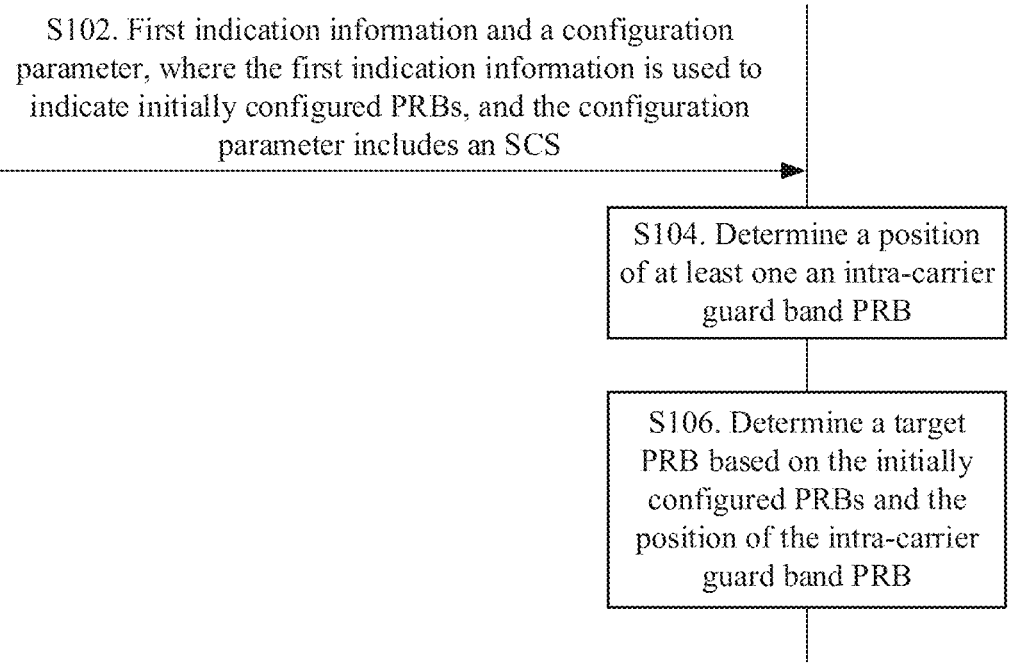
FIG. 2 is an exemplary flowchart for implementing a resource configuration method provided in a first aspect of this disclosure.

Based on the foregoing content, an embodiment of this disclosure provides a solution to configuring frequency domain resources in presence of an intra-carrier guard band. FIG. 2 is an exemplary flowchart for implementing a resource configuration method provided in a first aspect of this disclosure. As shown in FIG. 2, the method 100 includes the following steps.

S102. A network device sends first indication information and a configuration parameter to user equipment, where the first indication information is used to indicate initially configured PRBs in at least one LBT subband, and the configuration parameter includes an SCS.

S104. The user equipment receives the first indication information and the configuration parameter sent by the network device, and determines a position of at least one intra-carrier guard band PRB in the at least one LBT subband based on at least one of the first indication information, the configuration parameter, and a processing capability of the user equipment. The processing capability of the user equipment may include at least one of a quantity of power amplifiers (PA) and a quantity of analog filters.

S106. The user equipment determines a target PRB based on the initially configured PRBs and the position of the intra-carrier guard band PRB.

As shown in FIG. 2, steps S104 and S106 performed by the user equipment may implement the embodiment of the resource configuration method provided in the first aspect of this disclosure.

In this embodiment, the user equipment determines the position of the intra-carrier guard band PRB, and flexibly configures the target PRB based on the position of the intra-carrier guard band PRB. In an embodiment of this disclosure, S106 may include: obtaining the target PRB by removing the intra-carrier guard band PRB from the initially configured PRBs.

In this embodiment of this disclosure, the user equipment determines the position of the intra-carrier guard band PRB, and the user equipment obtains the target PRB by removing the intra-carrier guard band PRB from the initially configured PRBs. In this way, frequency domain resources can be effectively configured flexibly in presence of the intra-carrier guard band PRB.

In an embodiment of this disclosure, S104 may include:
determining guard band information based on the at least one of the first indication information, the configuration parameter, and the processing capability of the user equipment, where the guard band information includes at least one of the following: a maximum quantity of transmission PRBs transmitted in the LBT subband, a minimum intra-carrier guard bandwidth, and a minimum quantity of intra-carrier guard band PRBs; and determining the position of the intra-carrier guard band PRB based on the guard band information.

In an embodiment of this disclosure, the determining guard band information based on the at least one of the first indication information, the configuration parameter, and the processing capability of the user equipment includes at least one of the following:
determining the guard band information based on the SCS;
obtaining a bandwidth occupied by the initially configured PRBs or a subband quantity of the at least one LBT subband based on the first indication information, and determining the guard band information based on the occupied bandwidth or the subband quantity; and
determining the guard band information based on the processing capability.

In an example, the determining the guard band information may include: determining the guard band information based on the SCS.

The following uses an example to describe the determining the guard band information based on the SCS.

In a case in which the SCS is 15 kHz, a quantity of intra-carrier guard band PRBs is 4; in a case in which the SCS is 30 kHz, a quantity of intra-carrier guard band PRBs is 2; or in a case in which the SCS is 60 kHz, a quantity of intra-carrier guard band PRBs is 1.

In another example, the determining the guard band information may include: determining the guard band information based on the bandwidth occupied by the initially configured PRBs or the subband quantity of the at least one LBT subband.

The following uses an example to describe the determining the guard band information based on the occupied bandwidth.

In a case in which the bandwidth occupied by the PRBs is 20 MHz, the quantity of intra-carrier guard band PRBs is 2; or in a case in which the bandwidth occupied by the PRBs is 40 MHz, the quantity of intra-carrier guard band PRBs is 3.

In still another example, the determining the guard band information may include: receiving the processing capability sent by the user equipment, and determining the guard band information based on the processing capability.

In yet another example, the guard band information is determined based on at least two of the SCS, the first indication information, the processing capability. For example, the quantity of intra-carrier guard band PRBs is determined based on the SCS and the bandwidth occupied by the initially configured PRBs. A protocol specifies that the minimum quantity of intra-carrier guard band PRBs in different bandwidths (where the bandwidth is the bandwidth occupied by the PRBs) is shown in Table 1.

TABLE 1

| SCS (kHz) | 20 MHz $G_{RB}$ | 40 MHz $G_{RB}$ | 60 MHz $G_{RB}$ | 80 MHz $G_{RB}$ |
| --- | --- | --- | --- | --- |
| 15 | 4 | 6 | 8 | 10 |
| 30 | 2 | 3 | 4 | 5 |
| 60 | 1 | 2 | 2 | 3 |

Assuming that the SCS is 30 kHz, intra-carrier guard bands in different bandwidths can be found in Table 1. Specifically, in a case in which a transmission bandwidth is 20 MHz, the quantity of intra-carrier guard band PRBs is 2; in a case in which a transmission bandwidth is 40 MHz, the quantity of intra-carrier guard band PRBs is 3; or in a case in which a transmission bandwidth is 60 MHz, the quantity of intra-carrier guard band PRBs is 4.

Figure 3:
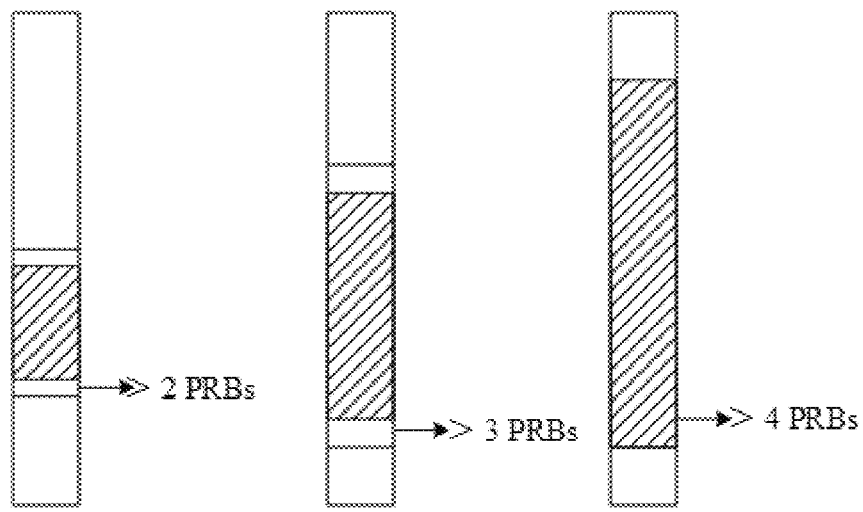
FIG. 3 is a schematic diagram of minimum quantities of intra-carrier guard band PRBs in different transmission bandwidths according to an embodiment of this disclosure.

As shown in FIG. 3, the left side is the 20 MHz transmission bandwidth, and the quantity of intra-carrier guard band PRBs is greater than 2; the middle is the 40 MHz transmission bandwidth, and the quantity of intra-carrier guard band PRBs is greater than 3; and the right side is the 60 MHz transmission bandwidth, and the quantity of intra-carrier guard band PRBs is greater than 4.

Figure 4:
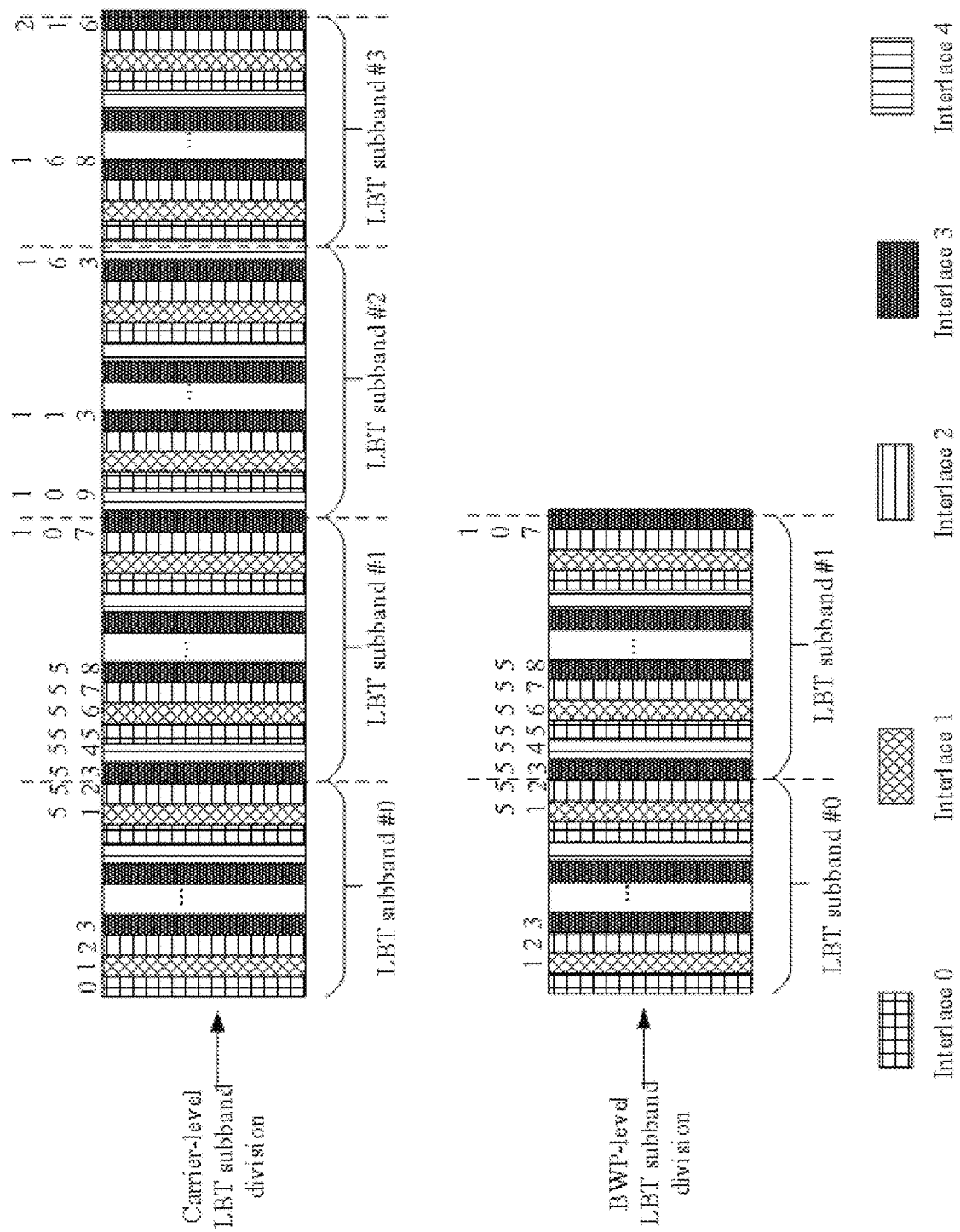
FIG. 4 is a schematic diagram of a frequency domain configuration of a PUCCH/SRS according to an embodiment of this disclosure.

In an example, referring to FIG. 4, if the network device configures an interlace index 1 of PUCCH/SRS resource allocation, and an LBT subband indication 1 for the user equipment, that is, if the foregoing first indication information includes the interlace index 1 and the LBT subband indication 1, PRB indexes configured for a PUCCH/SRS are a PRB #56, a PRB #61, . . . , a PRB #106 in an LBT subband #1, a total of 11 PRBs, that is, the 11 PRBs are PRBs initially configured by the network device.

If a PUCCH/SRS transmission bandwidth configured by the network device is 20 MHz, the intra-carrier guard band PRBs are at least two PRBs, and the intra-carrier guard band PRBs may be a PRB #53 and a PRB #54 at a head of the LBT subband #1, and the PRB #106 and a PRB #107 at a tail of the LBT subband #1. The intra-carrier guard band PRB is removed from the initially configured PRBs, that is, the PRB #106 is removed from the initially configured PRBs. In this case, PRB indexes configured for the PUCCH/SRS are the PRB #56, the PRB #61, . . . , the PRB #101, a total of 10 PRBs.

The LBT subband may be obtained by dividing a carrier-level LBT subband, or may be obtained by dividing a BWP-level LBT subband.

In an embodiment of this disclosure, the intra-carrier guard band PRB may be a PRB starting from an edge of the LBT subband, and a bandwidth of the intra-carrier guard band PRB is greater than or equal to the minimum intra-carrier guard bandwidth; or the intra-carrier guard band PRB may be a PRB starting from an edge of the LBT subband, and a quantity of intra-carrier guard band PRBs is greater than or equal to the minimum quantity of intra-carrier guard band PRBs.

In an embodiment of this disclosure, in a case in which the LBT subband is an LBT subband at a carrier edge, the LBT subband does not have the intra-carrier guard band PRB in a direction of the carrier edge; or in a case in which the LBT subband is an LBT subband at a BWP edge, the LBT subband does not have the intra-carrier guard band PRB in a direction of the BWP edge.

The following continues to use FIG. 4 to describe the LBT subband.

With continued reference to FIG. 4, the PRB initially configured by the network device is a PRB in the carrier-level LBT subband #0. Because the head of the LBT subband #0 (that is, a left edge of the LBT subband #0) is located at a head of a carrier, there is no intra-carrier guard band PRB at the head of the LBT subband #0, and there may be an intra-carrier guard band PRB at the tail of the LBT subband #0.

Figure 5:
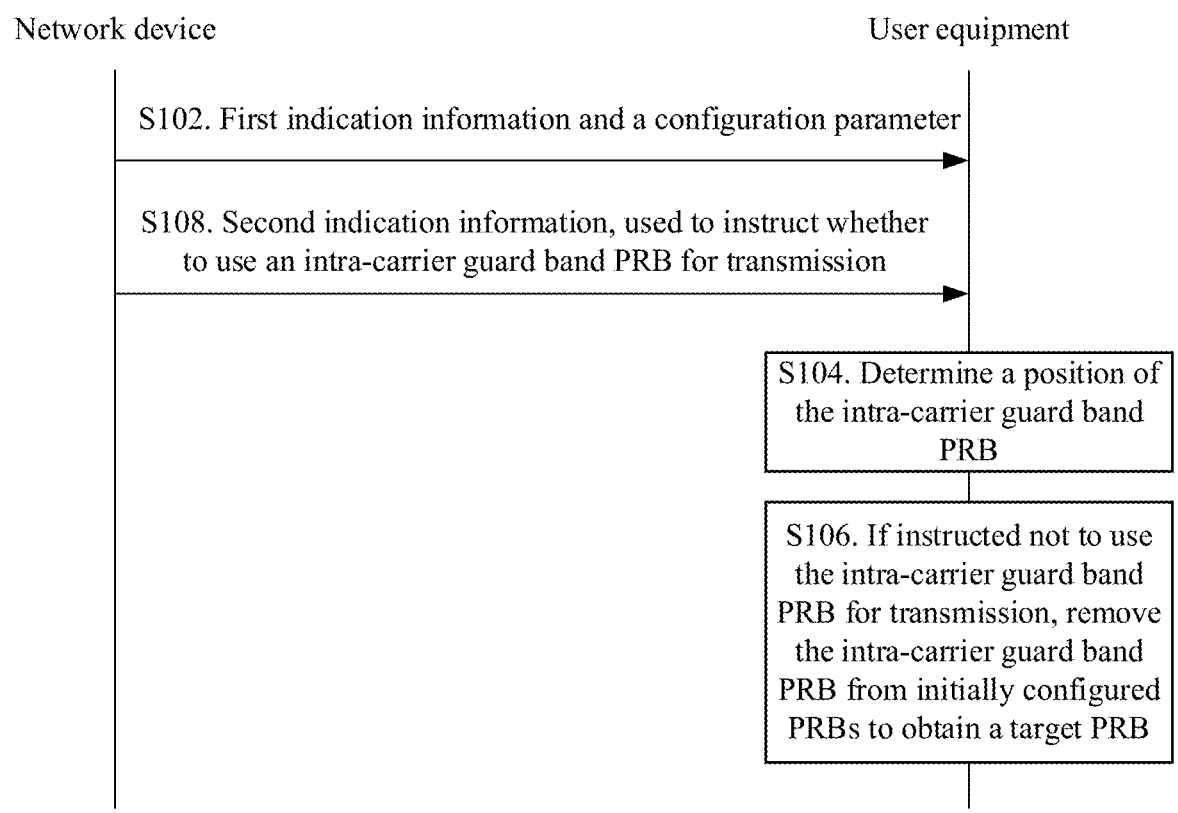
FIG. 5 is another exemplary flowchart for implementing the resource configuration method provided in the first aspect of this disclosure.

FIG. 5 is another exemplary flowchart for implementing the resource configuration method provided in the first aspect of this disclosure. A difference between FIG. 5 and FIG. 2 is that the resource configuration method 100A in FIG. 5 may further include:

S108. The network device sends second indication information to the user equipment, where the second indication information is used to instruct the user equipment whether to use the intra-carrier guard band PRB for transmission.

As shown in FIG. 5, steps S104 and S106 performed by the user equipment may implement the embodiment of the resource configuration method provided in the first aspect of this disclosure.

S106 in FIG. 5 may specifically include: in a case in which the second indication information received by the user equipment is used to instruct the user equipment not to use the intra-carrier guard band PRB for transmission, removing the intra-carrier guard band PRB from the initially configured PRBs.

In addition, the embodiment of the resource configuration method may further include: in a case in which the second indication information is used to instruct the user equipment to use the intra-carrier guard band PRB for transmission, not removing the intra-carrier guard band PRB from the initially configured PRBs.

Figure 6:
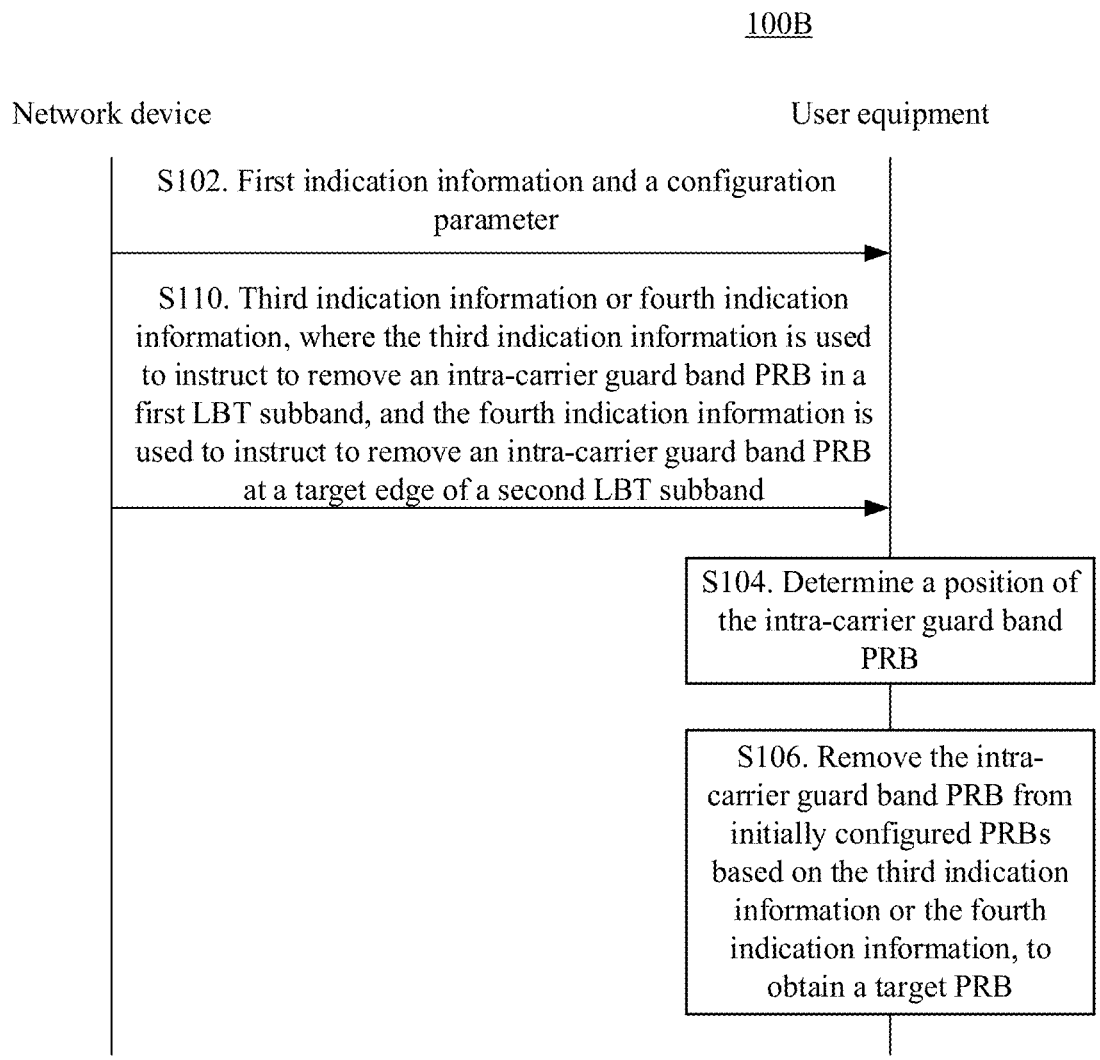
FIG. 6 is still another exemplary flowchart for implementing the resource configuration method provided in the first aspect of this disclosure.

FIG. 6 is still another exemplary flowchart for implementing the resource configuration method provided in the first aspect of this disclosure. A difference between FIG. 6 and FIG. 2 is that the resource configuration method 100B in FIG. 6 may further include:

S110. The network device sends third indication information or fourth indication information to the user equipment, where the third indication information is used to indicate a first LBT subband in the at least one LBT subband and instruct to remove the intra-carrier guard band PRB in the first LBT subband; and the fourth indication information is used to indicate a second LBT subband in the at least one LBT subband and instruct to remove the intra-carrier guard band PRB at a target edge of the second LBT subband.

As shown in FIG. 6, steps S104 and S106 performed by the user equipment may implement the embodiment of the resource configuration method provided in the first aspect of this disclosure.

In an example, the network device sends the third indication information to the user equipment. In this case, S106 in FIG. 6 may specifically include: the user equipment receives the third indication information, and for first PRBs in the first LBT subband in the initially configured PRBs, removing the intra-carrier guard band PRB from the first PRBs.

The network device instructs, by using the third indication information, the user equipment to remove intra-carrier guard band PRBs in specific LBT subbands. For example, with continued reference to FIG. 4, the initially configured PRBs are PRBs in the LBT subband #0 and LBT subband #1, and the third indication information instructs the user equipment to remove only the intra-carrier guard band PRB in the LBT subband #0, and not to remove the intra-carrier guard band PRB in the LBT subband #1.

In another example, the network device sends the fourth indication information to the user equipment. In this case, S106 in FIG. 6 may specifically include: the user equipment receives the fourth indication information, and removes the intra-carrier guard band PRB at the target edge from the initially configured PRBs.

The network device instructs, by using the fourth indication information, the user equipment to remove the intra-carrier guard band PRB at a specific end of the LBT subband. For example, with continued reference to FIG. 4, the initially configured PRBs are PRBs in the LBT subband #1, and the fourth indication information instructs the user equipment to remove the intra-carrier guard band PRB at the head of the LBT subband #1.

Figure 7:
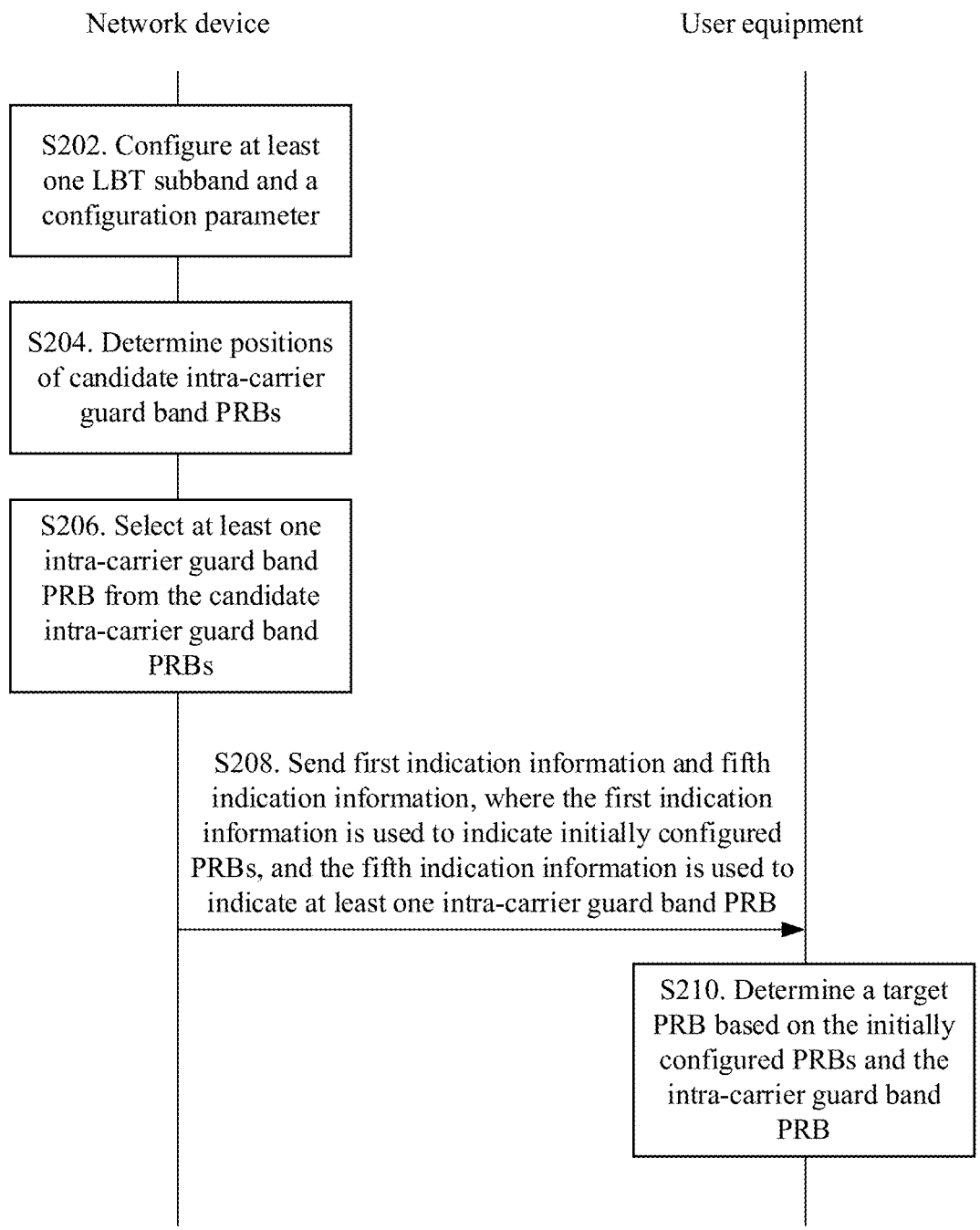
FIG. 7 is an exemplary flowchart for implementing a resource configuration method provided in a second aspect and a third aspect of this disclosure.

FIG. 7 is an exemplary flowchart for implementing a resource configuration method provided in a second aspect and a third aspect of this disclosure. As shown in FIG. 7, the resource configuration method 200 includes the following steps.

S202. A network device configures at least one LBT subband and a configuration parameter for user equipment, where the at least one LBT subband includes initially configured PRBs, and the configuration parameter includes an SCS.

S204. The network device determines positions of candidate intra-carrier guard band PRBs in the at least one LBT subband based on at least one of the at least one LBT subband, the configuration parameter, and a processing capability of the user equipment.

S206. The network device selects at least one intra-carrier guard band PRB from the candidate intra-carrier guard band PRBs based on the positions of the candidate intra-carrier guard band PRBs.

S208. The network device sends first indication information and fifth indication information to the user equipment, where the first indication information is used to indicate the initially configured PRBs in the at least one LBT subband, and the fifth indication information is used to indicate the at least one intra-carrier guard band PRB.

S210. The user equipment receives the first indication information and the fifth indication information, and determines a target PRB based on the initially configured PRBs and the intra-carrier guard band PRB. The intra-carrier guard band PRB may be removed from the initially configured PRBs to obtain the target PRB.

As shown in FIG. 7, the network device performs step S202 to step S208 to implement the embodiment of the resource configuration method provided in the second aspect of this disclosure, and the user equipment performs step S210 to implement the embodiment of the resource configuration method provided in the third aspect of this disclosure.

In this embodiment of this disclosure, the network device determines the target PRB based on the initially configured PRBs and the intra-carrier guard band PRB. In this way, frequency domain resources can be effectively configured flexibly in presence of the intra-carrier guard band PRB.

In an embodiment of this disclosure, S204 may include:
determining guard band information based on the at least one of the at least one LBT subband, the configuration parameter, and the processing capability, where the guard band information includes at least one of the following: a maximum quantity of transmission PRBs transmitted in the LBT subband, a minimum intra-carrier guard bandwidth, and a minimum quantity of intra-carrier guard band PRBs; and determining the positions of the candidate intra-carrier guard band PRBs based on the guard band information.

In an embodiment of this disclosure, the determining guard band information based on the at least one of the at least one LBT subband, the configuration parameter, and the processing capability includes at least one of the following:
determining the guard band information based on the SCS;
determining the guard band information based on a bandwidth occupied by the initially configured PRBs or a subband quantity of the at least one LBT subband; and
receiving the processing capability sent by the user equipment, and determining the guard band information based on the processing capability.

In an example, the determining the guard band information may include: determining the guard band information based on the SCS.

In another example, the determining the guard band information may include: determining the guard band information based on the bandwidth occupied by the initially configured PRBs or the subband quantity of the at least one LBT subband; and determining the guard band information based on the occupied bandwidth or the subband quantity.

In still another example, the determining the guard band information may include: receiving the processing capability sent by the user equipment, and determining the guard band information based on the processing capability.

Because how to determine the guard band information has been described in the description of the resource configuration method 100, details are not described herein again for brevity.

In an embodiment of this disclosure, the intra-carrier guard band PRB may be a PRB starting from an edge of the LBT subband, and a bandwidth of the intra-carrier guard band PRB may be greater than or equal to the minimum intra-carrier guard bandwidth; or the intra-carrier guard band PRB may be a PRB starting from an edge of the LBT subband, and a quantity of intra-carrier guard band PRBs may be greater than or equal to the minimum quantity of intra-carrier guard band PRBs.

In an embodiment of this disclosure, in a case in which the LBT subband is an LBT subband at a carrier edge, the LBT subband may not have the intra-carrier guard band PRB in a direction of the carrier edge; or in a case in which the LBT subband is an LBT subband at a bandwidth part BWP edge, the LBT subband may not have the intra-carrier guard band PRB in a direction of the BWP edge.

In an embodiment of this disclosure, S206 may include:
obtaining a plurality of guard band PRB sets based on the candidate intra-carrier guard band PRBs, where all PRBs in each guard band PRB set belong to the candidate intra-carrier guard band PRBs, and there is an intersection or no intersection between any two guard band PRB sets;
adding an identifier for each guard band PRB set; and
selecting a target guard band PRB set from the plurality of guard band PRB sets, where a PRB in the target guard band PRB set is the at least one intra-carrier guard band PRB; and the resource configuration method may further include:
sending sixth indication information to the user equipment,
where the sixth indication information is used to indicate the PRBs in each guard band PRB set and the identifier of each guard band PRB set, and the fifth indication information is used to indicate a target identifier of the target guard band PRB set and instruct to remove a PRB shared by the initially configured PRBs and the target guard band PRB set from the initially configured PRBs.

After the user equipment receives the sixth indication information sent by the network device, S210 may include:
obtaining, based on the target identifier, the target guard band PRB set having the target identifier from the plurality of guard band PRB sets; and removing the PRB shared by the initially configured PRBs and the target guard band PRB set from the initially configured PRBs.

In an embodiment of this disclosure, numbering the guard band PRB sets may include: sequentially numbering the plurality of guard band PRB sets from a predetermined value based on a bandwidth occupied by the initially configured PRBs or a subband quantity of the at least one LBT subband for the plurality of guard band PRB sets corresponding to the same occupied bandwidth or the same subband quantity.

The following uses an example to describe the numbering the guard band PRB sets in this embodiment.

Occupied bandwidths corresponding to a first guard band PRB set and a second guard band PRB set are 20 MHz, a number of the first guard band PRB set is 001, and a number of the second guard band PRB set is 002. Occupied bandwidths corresponding to a third guard band PRB set and a fourth guard band PRB set are 40 MHz, a number of the third guard band PRB set is 001, and a number of the fourth guard band PRB set is 002.

In a case in which this embodiment is used to number the guard band PRB sets, S210 may include:
obtaining, based on the bandwidth occupied by the initially configured PRBs or the subband quantity of the at least one LBT subband, the plurality of guard band PRB sets corresponding to the occupied bandwidth or the subband quantity; and obtaining the target guard band PRB set having the target identifier from the corresponding plurality of guard band PRB sets, to obtain the intra-carrier guard band PRB that needs to be removed.

In an embodiment of this disclosure, the numbering the guard band PRB sets may include sequentially numbering all the guard band PRB sets. For example, the number of the first guard band PRB set is 001, the number of the second guard band PRB set is 002, the number of the third guard band PRB set is 003, and so on.

In an embodiment of this disclosure, the resource configuration method may further include: the network device sends third indication information to the user equipment, where the third indication information is used to indicate a first LBT subband in the at least one LBT subband and instruct to remove the intra-carrier guard band PRB in the first LBT subband.

For first PRBs in the first LBT subband in the initially configured PRBs, the user equipment removes a PRB shared by the first PRBs and the at least one intra-carrier guard band PRB from the initially configured PRBs.

In an embodiment of this disclosure, the resource configuration method may further include: the network device sends fourth indication information to the user equipment, where the fourth indication information is used to indicate a second LBT subband in the at least one LBT subband and instruct to remove the intra-carrier guard band PRB at a target edge of the second LBT subband.

The user equipment removes the intra-carrier guard band PRB at the target edge of the second LBT subband from the initially configured PRBs.

Figure 8:
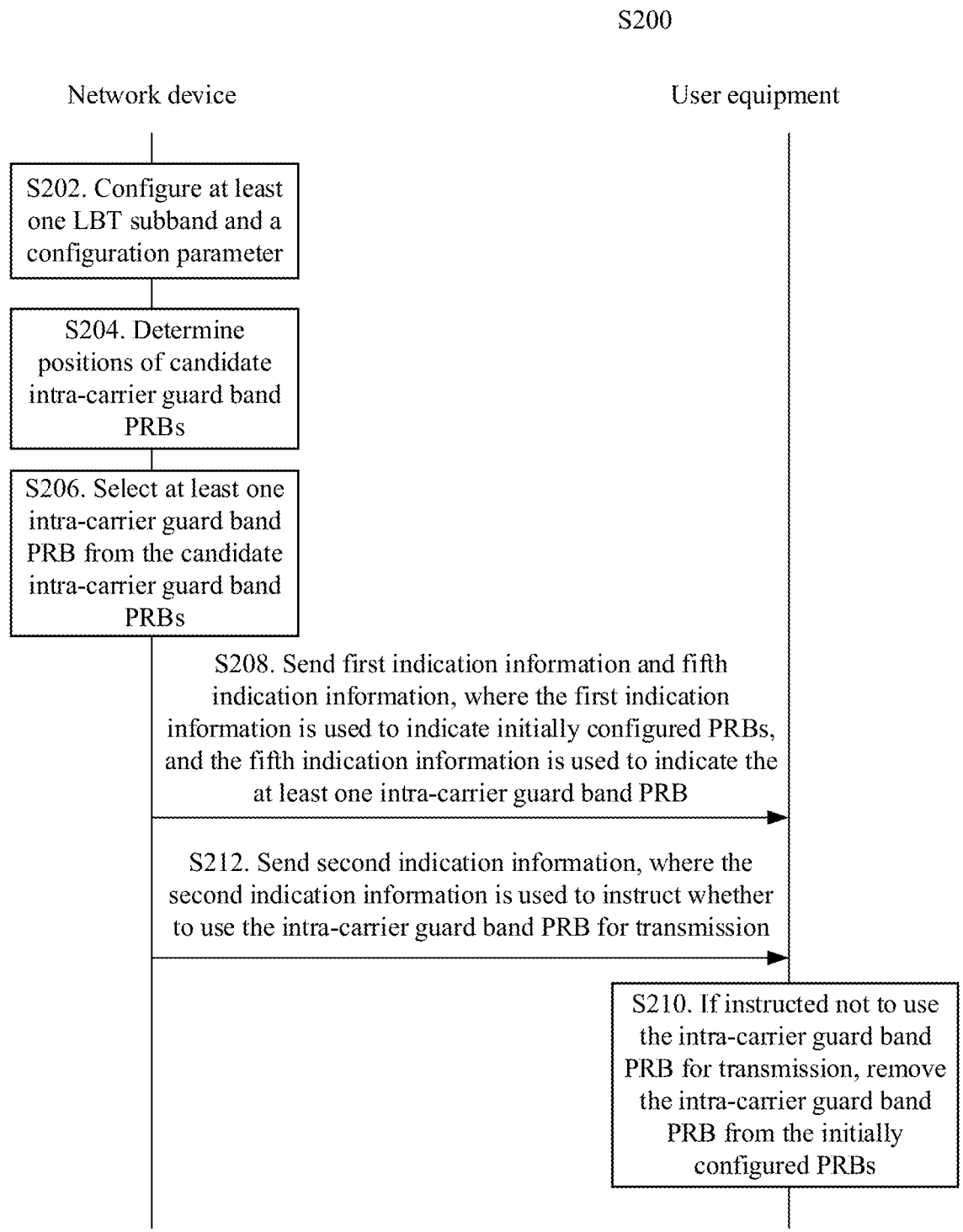
FIG. 8 is another exemplary flowchart for implementing the resource configuration method provided in the second aspect and the third aspect of this disclosure.

FIG. 8 is another exemplary flowchart for implementing the resource configuration method provided in the second aspect and the third aspect of this disclosure. A difference between FIG. 8 and FIG. 7 is that the resource configuration method 200A in FIG. 8 further includes:

S212. The network device sends second indication information to the user equipment, where the second indication information is used to instruct the user equipment whether to use the intra-carrier guard band PRB for transmission.

As shown in FIG. 8, steps S202 to S208, and S212 performed by the network device may implement the embodiment of the resource configuration method provided in the second aspect of this disclosure. Step S210 performed by the user equipment may implement the embodiment of the resource configuration method provided in the third aspect of this disclosure.

S210 in FIG. 8 may specifically include: in a case in which the second indication information is used to instruct not to use the intra-carrier guard band PRB for transmission, the user equipment removes the intra-carrier guard band PRB from the initially configured PRBs.

In addition, the resource configuration method in FIG. 8 may further include: in a case in which the second indication information is used to instruct to use the intra-carrier guard band PRB for transmission, the user equipment does not remove the intra-carrier guard band PRB from the initially configured PRBs.

Figure 9:
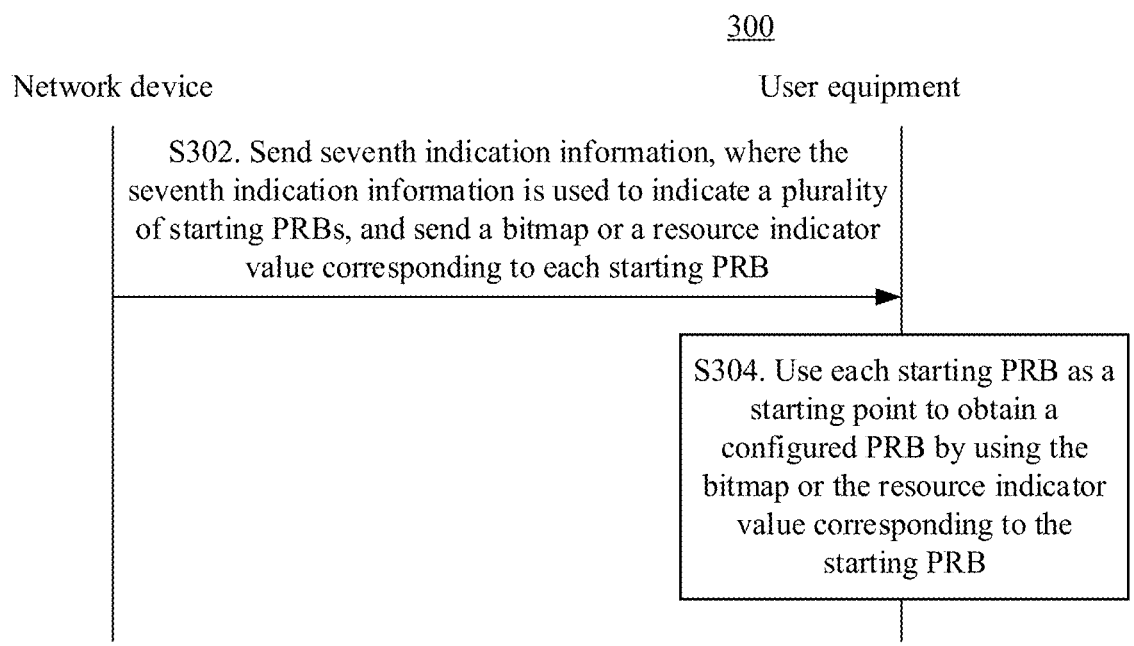
FIG. 9 is an exemplary flowchart for implementing a resource configuration method provided in a fourth aspect and a fifth aspect of this disclosure.

FIG. 9 is an exemplary flowchart for implementing a resource configuration method provided in a fourth aspect and a fifth aspect of this disclosure. As shown in FIG. 9, the resource configuration method 300 includes the following steps.

S302. A network device sends seventh indication information to user equipment, where the seventh indication information is used to indicate a plurality of starting PRBs, and sends a bitmap or a resource indicator value corresponding to each starting PRB.

S304. The user equipment uses each starting PRB as a starting point to obtain a configured PRB by using the bitmap or the resource indicator value corresponding to the starting PRB.

As shown in FIG. 9, step S302 performed by the network device may implement the embodiment of the resource configuration method provided in the fourth aspect of this disclosure. Step S304 performed by the user equipment may implement the embodiment of the resource configuration method provided in the fifth aspect of this disclosure.

In this embodiment of this disclosure, the network device indicates the plurality of starting PRBs, and uses each starting PRB as the starting point to obtain the configured PRB. In this way, the network device can flexibly configure the starting PRB, to bypass the intra-carrier guard band.

In an embodiment of this disclosure, the bitmaps corresponding to the plurality of starting PRBs are the same or different, or the resource indicator values corresponding to the plurality of starting PRBs are the same or different.

In an embodiment of this disclosure, the seventh indication information is used to indicate one starting PRB.

Figure 10:
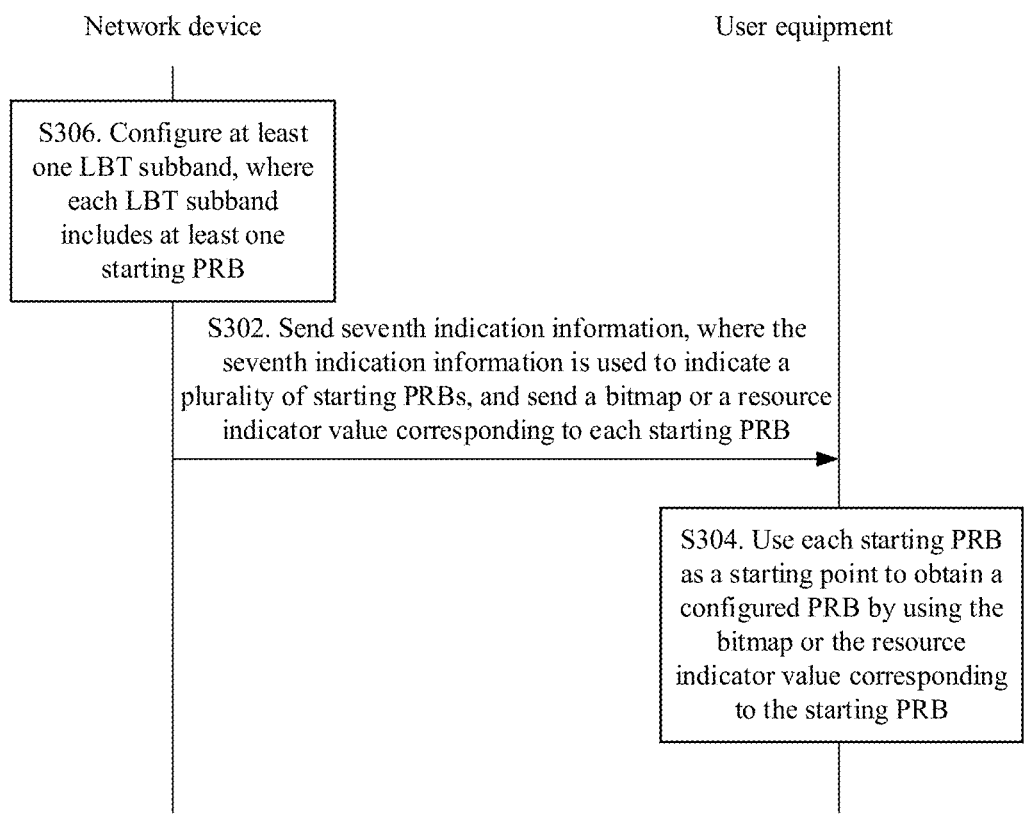
FIG. 10 is another exemplary flowchart for implementing the resource configuration method provided in the fourth aspect and the fifth aspect of this disclosure.

FIG. 10 is another exemplary flowchart for implementing the resource configuration method provided in the fourth aspect and the fifth aspect of this disclosure. A difference between FIG. 10 and FIG. 9 is that the resource configuration method 300A in FIG. 10 may further include:

S306. The network device configures at least one LBT subband, where each LBT subband includes at least one starting PRB. In other words, the at least one LBT subband includes a plurality of starting PRBs.

As shown in FIG. 10, step S306 and step S302 performed by the network device may implement the embodiment of the resource configuration method provided in the fourth aspect of this disclosure. Step S304 performed by the user equipment may implement the embodiment of the resource configuration method provided in the fifth aspect of this disclosure.

Figure 11:
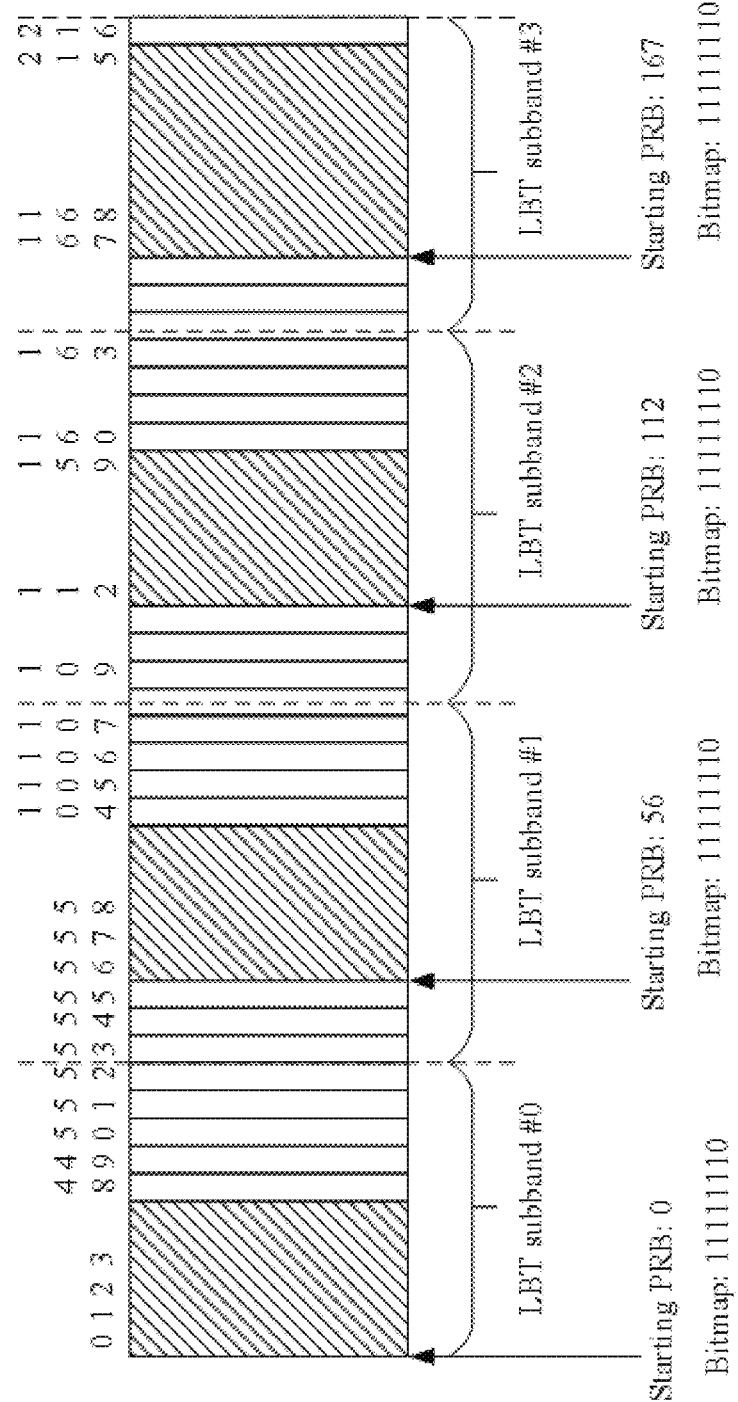
FIG. 11 is an exemplary schematic diagram of a frequency domain configuration of a Coreset according to an embodiment of this disclosure.

In an example, as shown in FIG. 11, when a frequency domain configuration of a Coreset spans four LBT subbands, four starting PRBs and bitmaps are introduced to configure the Coreset.

In another example, during data scheduling, one or more starting PRBs may be configured for each LBT subband through RRC, and at least one of an LBT subband scheduling indication and a starting PRB configuration indication is added to DCI, and the bitmap or the RIV uses the LBT subband as a starting point for scheduling in the LBT subband.

The following uses an example to describe the resource configuration method 300A.

For example, referring to FIG. 11, the network device configures four subband LBTs, where each subband LBT includes a starting PRB, and the starting PRB of each subband has two configurations: a configuration 1 and a configuration 2. Starting PRBs of the configuration 1 are a PRB #0, a PRB #56, a PRB #112, and a PRB #167. Starting PRBs of the configuration 2 are a PRB #0, a PRB #53, a PRB #109, and a PRB #165. DCI is sent to the user equipment, where the DCI includes at least one of an LBT subband indication and a starting PRB configuration indication (that is, the seventh indication information). If the LBT subband indication is 1010, and the starting PRB configuration is 1, and a bitmap is 11111110, PRBs in a shaded part in an LBT subband #0 and an LBT subband #2 in FIG. 11 are configured scheduled PRBs, that is, PRBs #0 to #47 and PRBs #112 to #159.

The resource configuration method in any one of the foregoing embodiments may be used to configure a plurality of types of frequency domain resources. The configurations include a frequency domain configuration of a control resource set (Coreset), a frequency domain configuration of a CSI-RS, a frequency domain configuration of an SRS, a frequency domain configuration of a PUCCH, and a frequency domain configuration of scheduling.

It should be noted that for each of the foregoing embodiments, an execution order of steps in the embodiment is not limited.

Figure 12:
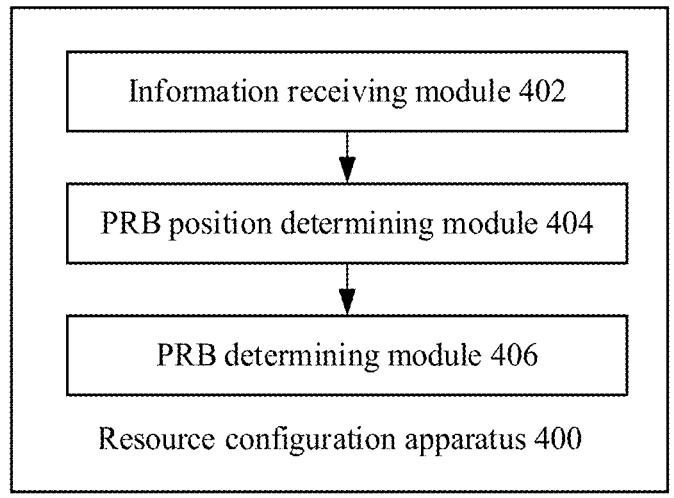
FIG. 12 is an exemplary schematic structural diagram of a resource configuration apparatus provided in a sixth aspect of this disclosure.

FIG. 12 is an exemplary schematic structural diagram of a resource configuration apparatus provided in a sixth aspect of this disclosure. The resource configuration apparatus is applied to user equipment. As shown in FIG. 12, the resource configuration apparatus 400 includes:

- an information receiving module 402, configured to receive first indication information and a configuration parameter that are sent by a network device, where the first indication information is used to indicate initially configured PRBs in at least one LBT subband, and the configuration parameter includes an SCS;
- a PRB position determining module 404, configured to determine a position of at least one intra-carrier guard band PRB in the at least one LBT subband based on at least one of the first indication information, the configuration parameter, and a processing capability of the user equipment; and
- a PRB determining module 406, configured to determine a target PRB based on the initially configured PRBs and the position of the intra-carrier guard band PRB. The intra-carrier guard band PRB in the initially configured PRBs is removed based on the position of the intra-carrier guard band PRB to obtain the target PRB.

In an embodiment of this disclosure, the PRB position determining module 404 may include:

- a guard band information determining module, configured to determine guard band information based on the at least one of the first indication information, the configuration parameter, and the processing capability of the user equipment, where the guard band information includes at least one of the following: a maximum quantity of transmission PRBs transmitted in the LBT subband, a minimum intra-carrier guard bandwidth, and a minimum quantity of intra-carrier guard band PRBs; and
- a guard band PRB position determining module, configured to determine the position of the intra-carrier guard band PRB based on the guard band information.

In an embodiment of this disclosure, the guard band information determining module may include at least one of the following:

- a first determining module, configured to determine the guard band information based on the SCS;
- a second determining module, configured to obtain a bandwidth occupied by the initially configured PRBs or a subband quantity of the at least one LBT subband based on the first indication information, and determine the guard band information based on the occupied bandwidth or the subband quantity; and
- a third determining module, configured to determine the guard band information based on the processing capability.

In an embodiment of this disclosure, the intra-carrier guard band PRB may be a PRB starting from an edge of the LBT subband, and a bandwidth of the intra-carrier guard band PRB is greater than or equal to the minimum intra-carrier guard bandwidth; or the intra-carrier guard band PRB may be a PRB starting from an edge of the LBT subband, and a quantity of intra-carrier guard band PRBs is greater than or equal to the minimum quantity of intra-carrier guard band PRBs.

In an embodiment of this disclosure, in a case in which the LBT subband is an LBT subband at a carrier edge, the LBT subband may not have the intra-carrier guard band PRB in a direction of the carrier edge; or in a case in which the LBT subband is an LBT subband at a bandwidth part BWP edge, the LBT subband may not have the intra-carrier guard band PRB in a direction of the BWP edge.

In an embodiment of this disclosure, the resource configuration apparatus 400 may further include:

- an indication receiving module, configured to receive second indication information sent by the network device, where the second indication information is used to instruct the user equipment whether to use the intra-carrier guard band PRB for transmission;
- the PRB determining module 406 is specifically configured to remove the intra-carrier guard band PRB from the initially configured PRBs in a case in which the second indication information is used to instruct the user equipment not to use the intra-carrier guard band PRB for transmission; and
- the PRB determining module 406 is further configured not to remove the intra-carrier guard band PRB from the initially configured PRBs in a case in which the second indication information is used to instruct the user equipment to use the intra-carrier guard band PRB for transmission.

In an embodiment of this disclosure, the resource configuration apparatus 400 may further include:

- a first indication receiving module, configured to receive third indication information sent by the network device, where the third indication information is used to indicate a first LBT subband in the at least one LBT subband and instruct to remove the intra-carrier guard band PRB in the first LBT subband; and
- the PRB determining module 406 is configured to: for first PRBs in the first LBT subband in the initially configured PRBs, remove the intra-carrier guard band PRB from the first PRBs.

In an embodiment of this disclosure, the resource configuration apparatus 400 may further include:

- a second indication receiving module, configured to receive fourth indication information sent by the network device, where the fourth indication information is used to indicate a second LBT subband in the at least one LBT subband and instruct to remove the intra-carrier guard band PRB at a target edge of the second LBT subband; and
- the PRB determining module 406 is configured to remove the intra-carrier guard band PRB at the target edge from the initially configured PRBs.

Figure 13:
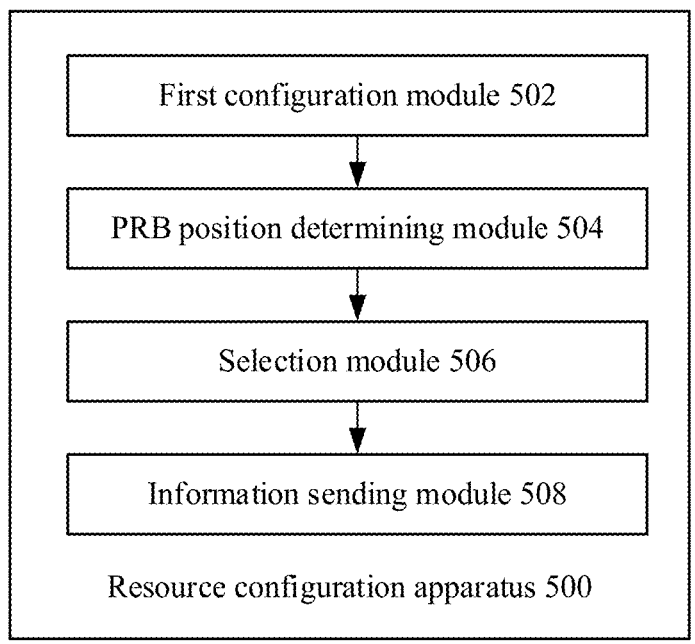
FIG. 13 is an exemplary schematic structural diagram of a resource configuration apparatus provided in a seventh aspect of this disclosure.

FIG. 13 is an exemplary schematic structural diagram of a resource configuration apparatus provided in a seventh aspect of this disclosure. The resource configuration apparatus is applied to a network device. As shown in FIG. 13, the resource configuration apparatus 500 includes:

- a first configuration module 502, configured to configure at least one LBT subband and a configuration parameter for user equipment, where the at least one LBT subband includes initially configured PRBs, and the configuration parameter includes an SCS;
- a PRB position determining module 504, configured to determine positions of candidate intra-carrier guard band PRBs in the at least one LBT subband based on at least one of the at least one LBT subband, the configuration parameter, and a processing capability of the user equipment;
- a selection module 506, configured to select at least one intra-carrier guard band PRB from the candidate intra-carrier guard band PRBs based on the positions of the candidate intra-carrier guard band PRBs; and an information sending module 508, configured to send first indication information and fifth indication information to the user equipment, where the first indication information is used to indicate the initially configured PRBs in the at least one LBT subband, and the fifth indication information is used to indicate the at least one intra-carrier guard band PRB, so that the user equipment removes the intra-carrier guard band PRB from the initially configured PRBs.

In an embodiment of this disclosure, the PRB position determining module 504 includes:

a guard band information determining module, configured to determine guard band information based on the at least one of the at least one LBT subband, the configuration parameter, and the processing capability, where the guard band information includes at least one of the following: a maximum quantity of transmission PRBs transmitted in the LBT subband, a minimum intra-carrier guard bandwidth, and a minimum quantity of intra-carrier guard band PRBs; and a guard band PRB position determining module, configured to determine the positions of the candidate intra-carrier guard band PRBs based on the guard band information.

In an embodiment of this disclosure, the guard band information determining module includes at least one of the following:

a first determining module, configured to determine the guard band information based on the SCS;

a second determining module, configured to determine the guard band information based on a bandwidth occupied by the initially configured PRBs or a subband quantity of the at least one LBT subband; and a third determining module, configured to receive the processing capability sent by the user equipment, and determine the guard band information based on the processing capability.

In an embodiment of this disclosure, the intra-carrier guard band PRB may be a PRB starting from an edge of the LBT subband, and a bandwidth of the intra-carrier guard band PRB is greater than or equal to the minimum intra-carrier guard bandwidth; or the intra-carrier guard band PRB may be a PRB starting from an edge of the LBT subband, and a quantity of intra-carrier guard band PRBs is greater than or equal to the minimum quantity of intra-carrier guard band PRBs.

In an embodiment of this disclosure, in a case in which the LBT subband is may be an LBT subband at a carrier edge, the LBT subband does not have the intra-carrier guard band PRB in a direction of the carrier edge; or in a case in which the LBT subband is an LBT subband at a bandwidth part BWP edge, the LBT subband may not have the intra-carrier guard band PRB in a direction of the BWP edge.

In an embodiment of this disclosure, the resource configuration apparatus 500 may further include:

a second indication information sending module, configured to send second indication information to the user equipment, where the second indication information is used to instruct the user equipment whether to use the intra-carrier guard band PRB for transmission and enable the user equipment to remove the intra-carrier guard band PRB from the initially configured PRBs in a case in which the second indication information is used to instruct not to use the intra-carrier guard band PRB for transmission, or enable the user equipment not to remove the intra-carrier guard band PRB from the initially configured PRBs in a case in which the second indication information is used to instruct to use the intra-carrier guard band PRB for transmission.

In an embodiment of this disclosure, the selection module 506 may include:

a set division module, configured to obtain a plurality of guard band PRB sets based on the candidate intra-carrier guard band PRBs, where all PRBs in each guard band PRB set belong to the candidate intra-carrier guard band PRBs, and there is an intersection or no intersection between any two guard band PRB sets;

an identifier addition module, configured to add an identifier for each guard band PRB set; and a set selection module, configured to select a target guard band PRB set from the plurality of guard band PRB sets, where a PRB in the target guard band PRB set is the at least one intra-carrier guard band PRB; and the resource configuration apparatus 500 may further include:

a sixth indication information sending module, configured to send sixth indication information to the user equipment, where the sixth indication information is used to indicate the PRBs in each guard band PRB set and the identifier of each guard band PRB set, and the fifth indication information is used to indicate a target identifier of the target guard band PRB set and instruct to remove a PRB shared by the initially configured PRBs and the target guard band PRB set from the initially configured PRBs.

In an embodiment of this disclosure, the identifier of each guard band PRB set is a number; and the identifier addition module may include:

a first numbering module, configured to sequentially number the plurality of guard band PRB sets from a predetermined value based on a bandwidth occupied by the initially configured PRBs or a subband quantity of the at least one LBT subband for the plurality of guard band PRB sets corresponding to the same occupied bandwidth or the same subband quantity; or a second numbering module, configured to sequentially number all the guard band PRB sets for all the guard band PRB sets.

In an embodiment of this disclosure, the resource configuration apparatus 500 may further include:

a third indication information sending module, configured to send third indication information to the user equipment, where the third indication information is used to indicate a first LBT subband in the at least one LBT subband and instruct to remove the intra-carrier guard band PRB in the first LBT subband; or a fourth indication information sending module, configured to send fourth indication information to the user equipment, where the fourth indication information is used to indicate a second LBT subband in the at least one LBT subband and instruct to remove the intra-carrier guard band PRB at a target edge of the second LBT subband, and the target edge is a head edge or a tail edge of the LBT subband.

Figure 14:
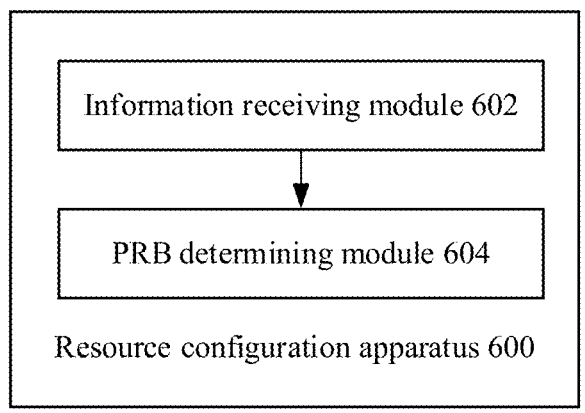
FIG. 14 is an exemplary schematic structural diagram of a resource configuration apparatus provided in an eighth aspect of this disclosure.

FIG. 14 is an exemplary schematic structural diagram of a resource configuration apparatus provided in an eighth aspect of this disclosure. The resource configuration apparatus is applied to user equipment. As shown in FIG. 14, the resource configuration apparatus 600 includes:

an information receiving module 602, configured to receive first indication information and fifth indication information sent by a network device, where the first indication information is used to indicate initially configured PRBs in at least one LBT subband, and the fifth indication information is used to indicate at least one intra-carrier guard band PRB; and a PRB determining module 604, configured to determine a target PRB based on the initially configured PRBs and the intra-carrier guard band PRB.

In an embodiment of this disclosure, the resource configuration apparatus 600 may further include:

a second indication information receiving module, configured to receive second indication information sent by the network device, where the second indication information is used to instruct the user equipment whether to use the intra-carrier guard band PRB for transmission;

the PRB determining module 604 is configured to remove the intra-carrier guard band PRB from the initially configured PRBs in a case in which the second indication information is used to instruct the user equipment not to use the intra-carrier guard band PRB for transmission; and the PRB determining module 604 is further configured not to remove the at least one intra-carrier guard band PRB from the initially configured PRBs in a case in which the second indication information is used to instruct the user equipment to use the intra-carrier guard band PRB for transmission.

In an embodiment of this disclosure, the resource configuration apparatus 600 may further include:

a sixth indication information receiving module, configured to receive sixth indication information sent by the network device, where the sixth indication information is used to indicate a PRB in each guard band PRB set in a plurality of guard band PRB sets and an identifier of each guard band PRB set, the fifth indication information is used to indicate a target identifier of a target guard band PRB set and instruct to remove a PRB shared by the initially configured PRBs and the target guard band PRB set from the initially configured PRBs, and the PRB in the target guard band PRB set is the at least one intra-carrier guard band PRB; and the PRB determining module 604 may include:
a set obtaining module, configured to obtain, based on the target identifier, the target guard band PRB set having the target identifier from the plurality of guard band PRB sets; and
a set removing module, configured to remove the PRB shared by the initially configured PRBs and the target guard band PRB set from the initially configured PRBs.

In an embodiment of this disclosure, the set obtaining module may be configured to:
obtain, based on a bandwidth occupied by the initially configured PRBs or a subband quantity of the at least one LBT subband, the plurality of guard band PRB sets corresponding to the occupied bandwidth or the subband quantity; and obtain the target guard band PRB set having the target identifier from the plurality of corresponding guard band PRB sets.

In an embodiment of this disclosure, the resource configuration apparatus 600 may further include:

a third indication information receiving module, configured to receive third indication information sent by the network device, where the third indication information is used to indicate a first LBT subband in the at least one LBT subband and instruct to remove the intra-carrier guard band PRB in the first LBT subband; and the PRB determining module 604 is configured to: for first PRBs in the first LBT subband in the initially configured PRBs, remove a PRB shared by the first PRBs and the at least one intra-carrier guard band PRB from the initially configured PRBs.

In an embodiment of this disclosure, the resource configuration apparatus 600 may further include:

a fourth indication information receiving module, configured to receive fourth indication information sent by the network device, where the fourth indication information is used to indicate a second LBT subband in the at least one LBT subband and instruct to remove the intra-carrier guard band PRB at a target edge of the second LBT subband, and the target edge is a head or a tail; and the PRB determining module 604 is specifically configured to remove the intra-carrier guard band PRB at the target edge from the initially configured PRBs.

Figure 15:
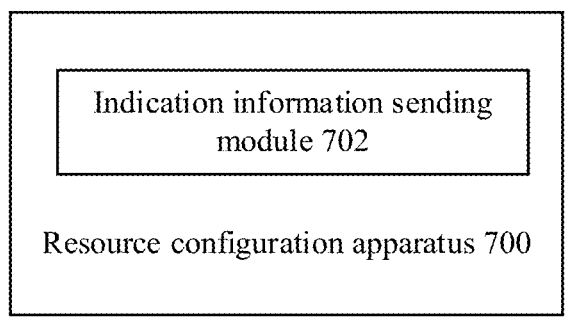
FIG. 15 is an exemplary schematic structural diagram of a resource configuration apparatus provided in a ninth aspect of this disclosure.

FIG. 15 is an exemplary schematic structural diagram of a resource configuration apparatus provided in a ninth aspect of this disclosure. The resource configuration apparatus is applied to a network device. As shown in FIG. 15, the resource configuration apparatus 700 includes:

an indication information sending module 702, configured to send seventh indication information to user equipment, where the seventh indication information is used to indicate a plurality of starting PRBs, and send a bitmap or a resource indicator value corresponding to each starting PRB, so that the user equipment uses each starting PRB as a starting point to obtain a configured PRB by using the bitmap or the resource indicator value corresponding to the starting PRB.

In an embodiment of this disclosure, the resource configuration apparatus 700 may further include:

a subband configuration module, configured to configure at least one LBT subband, where each LBT subband includes at least one starting PRB.

In an embodiment of this disclosure, the bitmaps corresponding to the plurality of starting PRBs are the same or different, or the resource indicator values corresponding to the plurality of starting PRBs are the same or different.

Figure 16:
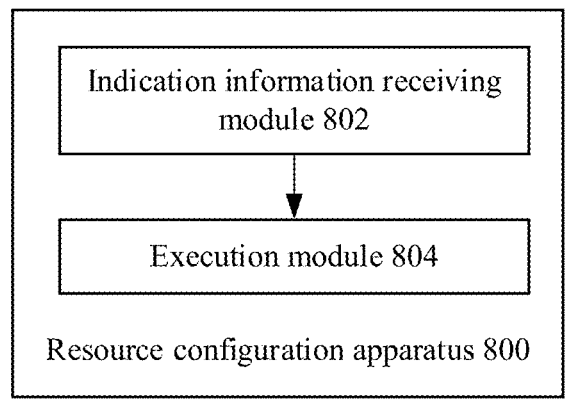
FIG. 16 is an exemplary schematic structural diagram of a resource configuration apparatus provided in a tenth aspect of this disclosure.

FIG. 16 is an exemplary schematic structural diagram of a resource configuration apparatus provided in a tenth aspect of this disclosure. The resource configuration apparatus is applied to user equipment. As shown in FIG. 16, the resource configuration apparatus 800 includes:

an indication information receiving module 802, configured to receive seventh indication information sent by a network device, where the seventh indication information is used to indicate a plurality of starting PRBs, and receive a bitmap or a resource indicator value corresponding to each starting PRB and sent by the network device; and an execution module 804, configured to use each starting PRB as a starting point to obtain a configured PRB by using the bitmap or the resource indicator value corresponding to the starting PRB.

In an embodiment of this disclosure, the plurality of starting PRBs may be at least one starting PRB included in each LBT subband in at least one LBT subband.

In an embodiment of this disclosure, the bitmaps corresponding to the plurality of starting PRBs are the same or different, or the resource indicator values corresponding to the plurality of starting PRBs are the same or different.

In an embodiment of this disclosure, the seventh indication information is used to indicate one starting PRB.

According to an eleventh aspect, an embodiment of this disclosure provides user equipment, including a processor, a memory, and a computer program stored in the memory and capable of running on the processor. When the computer program is executed by the processor, each process of the foregoing resource configuration method embodiment in the first aspect, the third aspect, or the fifth aspect is implemented, with the same technical effect achieved. To avoid repetition, details are not described herein again.

Figure 17:
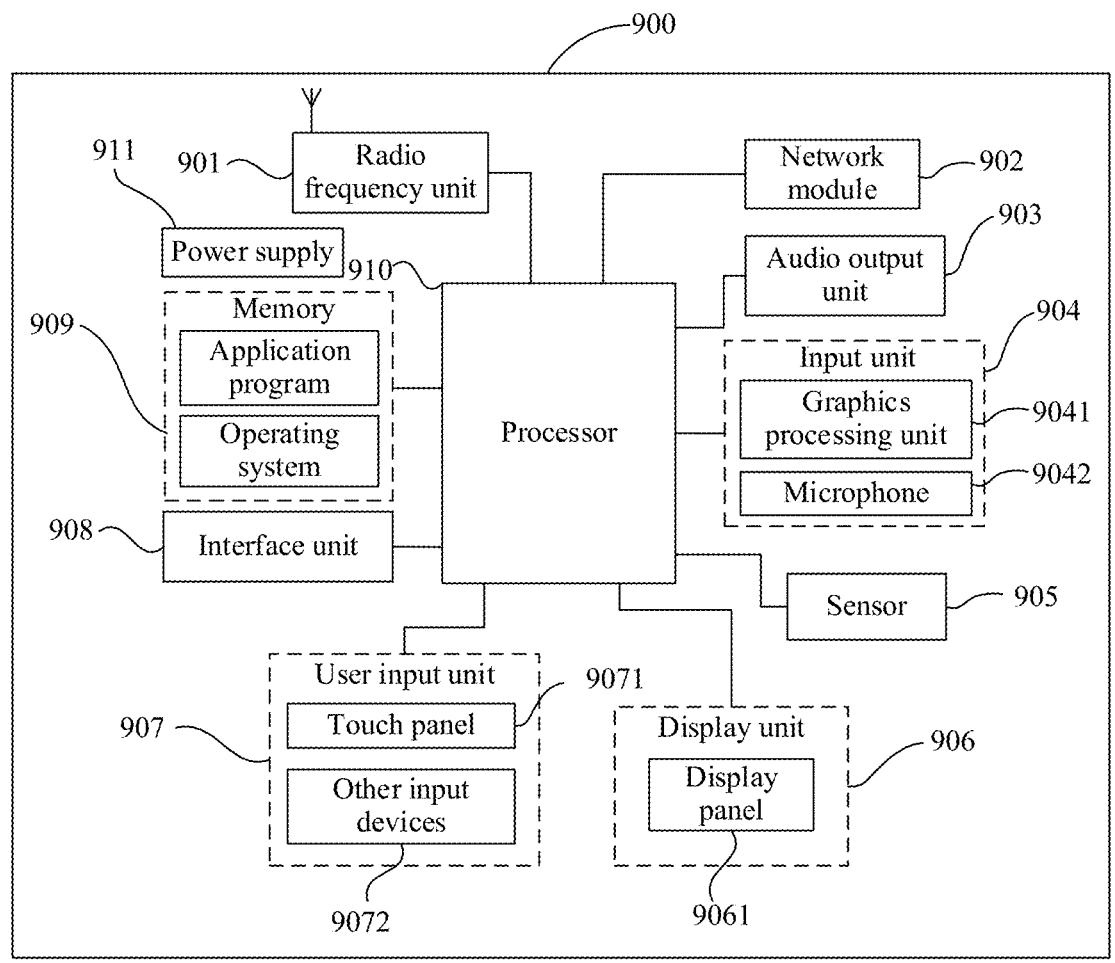
FIG. 17 is an exemplary schematic structural diagram of user equipment provided in an eleventh aspect of this disclosure.

FIG. 17 is an exemplary schematic structural diagram of user equipment provided in the eleventh aspect of this disclosure. The user equipment 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the user equipment structure shown in FIG. 17 does not constitute any limitation on the user equipment. The user equipment may include more or fewer components than those shown in the figure, or some components may be combined, or the components may be disposed in different manners. In this embodiment of this disclosure, the user equipment includes but is not limited to a mobile phone, a tablet computer, a laptop computer, a palmtop computer, an in-vehicle terminal, a wearable device, a pedometer, and the like.

In an embodiment, the radio frequency unit 901 is configured to receive first indication information and a configuration parameter that are sent by a network device, where the first indication information is used to indicate initially configured PRBs in at least one LBT subband, and the configuration parameter includes an SCS; and the processor 910 is configured to determine a position of at least one intra-carrier guard band PRB in the at least one LBT subband based on at least one of the first indication information, the configuration parameter, and a processing capability of the user equipment; and determine a target PRB based on the position of the intra-carrier guard band PRB and the initially configured PRBs.

In an embodiment, the radio frequency unit 901 is configured to receive first indication information and fifth indication information sent by a network device, where the first indication information is used to indicate initially configured PRBs in at least one LBT subband, and the fifth indication information is used to indicate at least one intra-carrier guard band PRB; and the processor 910 is configured to determine a target PRB based on the initially configured PRBs and the intra-carrier guard band PRB.

In an embodiment, the radio frequency unit 901 is configured to receive seventh indication information sent by a network device, where the seventh indication information is used to indicate a plurality of starting PRBs, and receive a bitmap or a resource indicator value corresponding to each starting PRB and sent by the network device; and the processor 910 is configured to use each starting PRB as a starting point to obtain a configured PRB by using the bitmap or the resource indicator value corresponding to the starting PRB.

In this embodiment of this disclosure, in a case of presence of an intra-carrier guard band, frequency domain resources can be configured flexibly.

The processor 910 is a control center of the user equipment, and is connected to all components of the user equipment by using various interfaces and lines. By running or executing at least one of a software program and module that is stored in the memory 909 and invoking data stored in the memory 909, the processor 910 executes various functions of the user equipment and processes data, to perform overall monitoring on the user equipment. The processor 910 may include one or more processing units. In an example, an application processor and a modem processor may be integrated in the processor 910. The application processor primarily processes an operating system, user interfaces, application programs, and the like. The modem processor primarily processes radio communication. It can be understood that the modem processor may alternatively be not integrated in the processor 910.

It should be understood that in this embodiment of this disclosure, the radio frequency unit 901 may be configured to receive and send information, or to receive and send a signal in a call process, and specially, after receiving downlink data from a base station, send the downlink data to the processor 910 for processing; and also send uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The user equipment provides a user with wireless wideband internet access through the network module 902, for example, helping the user send or receive an e-mail, browse a web page, or access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the user equipment 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. A processed image frame may be displayed on the display unit 906. The image frame processed by the graphics processing unit 9041 may be stored in the memory 909 (or another storage medium) or be sent by the radio frequency unit 901 or the network module 902. The microphone 9042 is capable of receiving sounds and processing such sounds into audio data. The processed audio data can be converted into a format output that can be sent to a mobile communication base station through the radio frequency unit 901 in a telephone call mode.

The user equipment 900 further includes at least one sensor 905, such as an optical sensor, a motion sensor, and other sensors. Specifically, the optical sensor includes an ambient light sensor and a proximity sensor. The ambient light sensor may adjust luminance of a display panel 9061 based on brightness of ambient light. The proximity sensor may turn off at least one of the display panel 9061 and backlight when the user equipment 900 is moved to an ear. As a type of motion sensor, an accelerometer sensor can detect magnitudes of accelerations in all directions (usually three axes), can detect a magnitude and a direction of gravity when the user equipment is in a static state, and can be applied to user equipment posture recognition (such as screen switching between portrait and landscape, related games, and magnetometer posture calibration), functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include a display panel 9061, and the display panel 9061 may be configured in a form of a liquid crystal display (LCD), an organic light-emitting diode (OLED), or the like.

The user input unit 907 may be configured to receive input digit or character information and generate key signal input related to user setting and function control of the user equipment. Specifically, the user input unit 907 includes a touch panel 9071 and other input devices 9072. The touch panel 9071 is also referred to as a touchscreen and can collect a touch operation (such as an operation performed by the user on the touch panel 9071 or near the touch panel 9071 with a finger or by using any proper object or accessory such as a stylus) of the user on or near the touch panel 9071. The touch panel 9071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 910, and receives a command sent by the processor 910 and executes the command. In addition, the touch panel 9071 may be implemented in a plurality of forms, for example, a resistive, capacitive, infrared, or surface acoustic wave touch panel. The user input unit 907 may further include other input devices 9072 in addition to the touch panel 9071. Specifically, the other input devices 9072 may include but are not limited to a physical keyboard, a function key (such as a volume control key or a switch key), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. Although in FIG. 17, the touch panel 9071 and the display panel 9061 act as two independent parts to implement input and output functions of the user equipment, in some embodiments, the touch panel 9071 and the display panel 9061 may be integrated to implement the input and output functions of the user equipment. This is not specifically limited herein.

The interface unit 908 is an interface connecting an external apparatus to the user equipment 900. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 908 may be configured to: receive input (for example, data information and power) from the external apparatus, and transmit the received input to one or more elements in the user equipment 900, or may be configured to transmit data between the user equipment 900 and the external apparatus.

The memory 909 may be configured to store software programs and various data. The memory 909 may primarily include a program storage area and a data storage area. The program storage area may store an operating system, an application program (such as an audio play function and an image play function) required by at least one function, and the like. The data storage area may store data (such as audio data and a phone book) created based on use of the mobile phone. In addition, the memory 909 may include a high-speed random access memory, and may further include a non-volatile memory such as a disk storage device, a flash memory device, or another volatile solid-state storage device. The memory 909 may store a computer program. When the computer program is executed by the processor 910, each process of the foregoing resource configuration method embodiment in the first aspect, the third aspect, or the fifth aspect is implemented.

The user equipment 900 may further include the power supply 911 (such as a battery) for supplying power to the components. In an example, the power supply 911 may be logically connected to the processor 910 through a power management system. In this way, functions such as charge management, discharge management, and power consumption management are implemented by using the power management system.

In addition, the user equipment 900 includes some functional modules that are not shown, details of which are not described herein.

A twelfth aspect of this disclosure further provides a network device, including a processor, a memory, and a computer program stored in the memory and capable of running on the processor. When the computer program is executed by the processor, each process of the foregoing resource configuration method embodiment in the second aspect or the fourth aspect is implemented, with the same technical effect achieved. To avoid repetition, details are not described herein again.

A thirteenth aspect of this disclosure further provides a computer-readable storage medium, where the computer-readable storage medium stores a computer program. When the computer program is executed by a processor, each process of the foregoing resource configuration method embodiment is implemented, with the same technical effect achieved. To avoid repetition, details are not described again herein. The computer-readable storage medium includes, for example, a non-transitory computer-readable storage medium, such as a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

The aspects of this disclosure are described above with reference to the flowcharts and/or block diagrams of the methods, apparatuses (systems), or computer program products according to the embodiments of this disclosure. It should be understood that each block in the flowcharts and/or block diagrams, and a combination of blocks in the flowcharts and/or block diagrams may be implemented by using computer program instructions. These computer program instructions may be provided for a general-purpose computer, a special-purpose computer, or a processor of any other programmable data processing apparatus to generate a machine, so that the computer or the processor of any other programmable data processing apparatus can execute the instructions to implement functions or actions specified in one or more blocks in the flowcharts and/or block diagrams. The processor may be but is not limited to a general-purpose processor, a special-purpose processor, an application-specific processor, or a field programmable logic array. It should also be understood that each block in the block diagrams and/or the flowcharts and a combination of the blocks in the block diagrams and/or the flowcharts may also be implemented by a dedicated hardware-based system for executing a specified function or action or may be implemented by a combination of dedicated hardware and computer instructions.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this disclosure.

The foregoing describes the embodiments of this disclosure with reference to the accompanying drawings. However, this disclosure is not limited to the foregoing specific implementations. The foregoing specific implementations are merely illustrative rather than restrictive. Inspired by this disclosure, a person of ordinary skill in the art may develop many other forms without departing from principles of this disclosure and the protection scope of the claims, and all such forms fall within the protection scope of this disclosure.

What is claimed is:

1. A resource configuration method, applied to user equipment, wherein the method comprises:
receiving first indication information and a configuration parameter that are sent by a network device, wherein the first indication information is used to indicate initially configured physical resource blocks (PRBs) in at least one listen before talk (LBT) subband, and the configuration parameter comprises a subcarrier spacing (SCS);
determining a position of at least one intra-carrier guard band PRB in the at least one LBT subband based on at least one of the first indication information, the configuration parameter, or a processing capability of the user equipment; and
determining a target PRB based on the initially configured PRBs and the position of the intra-carrier guard band PRB.

2. The method according to claim 1, wherein the determining a position of at least one intra-carrier guard band PRB in the at least one LBT subband based on at least one of the first indication information, the configuration parameter, or a processing capability of the user equipment comprises:
determining guard band information based on the at least one of the first indication information, the configuration parameter, or the processing capability of the user equipment, wherein the guard band information comprises at least one of the following: a maximum quantity of transmission PRBs transmitted in the LBT subband, a minimum intra-carrier guard bandwidth, or a minimum quantity of intra-carrier guard band PRBs; and
determining the position of the intra-carrier guard band PRB based on the guard band information.

3. The method according to claim 2, wherein the determining guard band information based on the at least one of the first indication information, the configuration parameter, or the processing capability of the user equipment comprises at least one of the following:
determining the guard band information based on the SCS;
obtaining a bandwidth occupied by the initially configured PRBs or a subband quantity of the at least one LBT subband based on the first indication information, and determining the guard band information based on the occupied bandwidth or the subband quantity; or
determining the guard band information based on the processing capability.

4. The method according to claim 1, wherein the determining a target PRB based on the initially configured PRBs and the position of the intra-carrier guard band PRB comprises:
obtaining the target PRB by removing the intra-carrier guard band PRB from the initially configured PRBs.

5. The method according to claim 4, wherein the method further comprises:
receiving second indication information sent by the network device, wherein the second indication information is used to indicate a first LBT subband in the at least one LBT subband and instruct to remove the intra-carrier guard band PRB in the first LBT subband; and
the removing the intra-carrier guard band PRB from the initially configured PRBs comprises:
for first PRBs in the first LBT subband in the initially configured PRBs, removing the intra-carrier guard band PRB from the first PRBs.

6. User equipment, comprising a processor, a memory, and a program or an instruction stored in the memory and capable of running on the processor, wherein the program or the instruction, when executed by the processor, causes the user equipment to perform:
receiving first indication information and a configuration parameter that are sent by a network device, wherein the first indication information is used to indicate initially configured physical resource blocks (PRBs) in at least one listen before talk (LBT) subband, and the configuration parameter comprises a subcarrier spacing (SCS);
determining a position of at least one intra-carrier guard band PRB in the at least one LBT subband based on at least one of the first indication information, the configuration parameter, or a processing capability of the user equipment; and
determining a target PRB based on the initially configured PRBs and the position of the intra-carrier guard band PRB.

7. The user equipment according to claim 6, wherein when determining a position of at least one intra-carrier guard band PRB in the at least one LBT subband based on at least one of the first indication information, the configuration parameter, or a processing capability of the user equipment, the program or the instruction, when executed by the processor, causes the user equipment to perform:
   determining guard band information based on the at least one of the first indication information, the configuration parameter, or the processing capability of the user equipment, wherein the guard band information comprises at least one of the following: a maximum quantity of transmission PRBs transmitted in the LBT subband, a minimum intra-carrier guard bandwidth, or a minimum quantity of intra-carrier guard band PRBs; and
   determining the position of the intra-carrier guard band PRB based on the guard band information.

8. The user equipment according to claim 7, wherein when determining guard band information based on the at least one of the first indication information, the configuration parameter, or the processing capability of the user equipment, the program or the instruction, when executed by the processor, causes the user equipment to perform at least one of the following:
   determining the guard band information based on a subcarrier spacing (SCS);
   obtaining a bandwidth occupied by the initially configured PRBs or a subband quantity of the at least one LBT subband based on the first indication information, and determining the guard band information based on the occupied bandwidth or the subband quantity; or
   determining the guard band information based on the processing capability.

9. The user equipment according to claim 6, wherein the determining a target PRB based on the initially configured PRBs and the position of the intra-carrier guard band PRB, the program or the instruction, when executed by the processor, causes the user equipment to perform:
   obtaining the target PRB by removing the intra-carrier guard band PRB from the initially configured PRBs.

10. The user equipment according to claim 9, wherein when the program or the instruction, when executed by the processor, causes the user equipment to further perform:
    receiving second indication information sent by the network device, wherein the second indication information is used to indicate a first LBT subband in the at least one LBT subband and instruct to remove the intra-carrier guard band PRB in the first LBT subband; and
    when removing the intra-carrier guard band PRB from the initially configured PRBs, the program or the instructions, when executed by the processor, causes the user equiment to perform:
    for first PRBs in the first LBT subband in the initially configured PRBs, removing the intra-carrier guard band PRB from the first PRBs.

11. A non-transitory computer-readable storage medium, wherein the non-transitory computer-readable storage medium stores a program or an instruction, wherein the program or the instruction, when executed by a processor of user equipment, causes the processor to perform:
    receiving first indication information and a configuration parameter that are sent by a network device, wherein the first indication information is used to indicate initially configured physical resource blocks (PRBs) in at least one listen before talk (LBT) subband, and the configuration parameter comprises a subcarrier spacing (SCS);
    determining a position of at least one intra-carrier guard band PRB in the at least one LBT subband based on at least one of the first indication information, the configuration parameter, or a processing capability of the user equipment; and
    determining a target PRB based on the initially configured PRBs and the position of the intra-carrier guard band PRB.

12. The non-transitory computer-readable storage medium according to claim 11, wherein when determining a position of at least one intra-carrier guard band PRB in the at least one LBT subband based on at least one of the first indication information, the configuration parameter, or a processing capability of the user equipment, the program or the instruction, when executed by the processor, causes the processor to perform:
    determining guard band information based on the at least one of the first indication information, the configuration parameter, or the processing capability of the user equipment, wherein the guard band information comprises at least one of the following: a maximum quantity of transmission PRBs transmitted in the LBT subband, a minimum intra-carrier guard bandwidth, or a minimum quantity of intra-carrier guard band PRBs; and
    determining the position of the intra-carrier guard band PRB based on the guard band information.

13. The non-transitory computer-readable storage medium according to claim 12, wherein when determining guard band information based on the at least one of the first indication information, the configuration parameter, or the processing capability of the user equipment, the program or the instruction, when executed by the processor, causes the processor to perform at least one of the following:
    determining the guard band information based on a subcarrier spacing (SCS);
    obtaining a bandwidth occupied by the initially configured PRBs or a subband quantity of the at least one LBT subband based on the first indication information, and determining the guard band information based on the occupied bandwidth or the subband quantity; or
    determining the guard band information based on the processing capability.

14. The non-transitory computer-readable storage medium according to claim 11, wherein the determining a target PRB based on the initially configured PRBs and the position of the intra-carrier guard band PRB, the program or the instruction, when executed by the processor, causes the processor to perform:
    obtaining the target PRB by removing the intra-carrier guard band PRB from the initially configured PRBs.

15. The non-transitory computer-readable storage medium according to claim 14, wherein the program or the instruction, when executed by the processor, causes the processor to further perform:
    receiving second indication information sent by the network device, wherein the second indication information is used to indicate a first LBT subband in the at least one LBT subband and instruct to remove the intra-carrier guard band PRB in the first LBT subband; and when removing the intra-carrier guard band PRB from the initially configured PRBs, the program or the instruction, when executed by the processor, causes the processor to perform:

for first PRBs in the first LBT subband in the initially configured PRBs, removing the intra-carrier guard band PRB from the first PRBs.

* * * * *